(12) United States Patent
Zenno et al.

(10) Patent No.: US 7,367,923 B2
(45) Date of Patent: May 6, 2008

(54) APPARATUS AND METHOD FOR CONTROLLING TRANSMISSION OF STRADDLE-TYPE VEHICLE

(75) Inventors: Toru Zenno, Shizuoka-ken (JP); Makoto Kosugi, Shizuoka-ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 224 days.

(21) Appl. No.: 11/299,720

(22) Filed: Dec. 12, 2005

(65) Prior Publication Data

US 2006/0160660 A1 Jul. 20, 2006

(30) Foreign Application Priority Data

Dec. 10, 2004 (JP) .............................. 2004-359226

(51) Int. Cl.
*B60W 10/02* (2006.01)
(52) U.S. Cl. ........................ 477/180; 477/176
(58) Field of Classification Search ................ 477/180, 477/175, 176
See application file for complete search history.

(56) References Cited

U.S. PATENT DOCUMENTS

| | | | |
|---|---|---|---|
| 1,500,878 A | 7/1924 | Kruchten | |
| 6,865,966 B2 * | 3/2005 | Shimaguchi | 74/336 R |
| 6,893,379 B2 * | 5/2005 | Sakamoto et al. | 477/156 |
| 7,108,634 B2 * | 9/2006 | Kumazawa | 477/176 |
| 7,255,664 B2 * | 8/2007 | Ohta | 477/175 |
| 2006/0094567 A1 | 5/2006 | Kosugi et al. | |
| 2006/0124422 A1 | 6/2006 | Zenno | |
| 2006/0128525 A1 | 6/2006 | Zenno | |
| 2006/0128527 A1 | 6/2006 | Zenno et al. | |
| 2006/0160660 A1 | 7/2006 | Zenno et al. | |
| 2006/0169561 A1 | 8/2006 | Ooishi et al. | |
| 2006/0169562 A1 | 8/2006 | Kosugi | |

(Continued)

FOREIGN PATENT DOCUMENTS

DE 4336445 4/1995

(Continued)

OTHER PUBLICATIONS

Co-Pending U.S. Appl. No. 11/514,387, filed Aug. 31, 2006. Title: Clutch Failure Detector, Automatic Clutch System, and Straddle-Type Vehicle.

(Continued)

*Primary Examiner*—Ha D. Ho
(74) *Attorney, Agent, or Firm*—Knobbe, Martens, Olson & Bear, LLP

(57) ABSTRACT

A transmission control apparatus is provided for a straddle-type vehicle that has a clutch and a transmission with a dog clutch having a first gear and a second gear. The transmission control apparatus includes a clutch actuator configured to engage and disengage the clutch. A transmission actuator is configured to change a gear of the transmission. An input device is configured to generate a gear change command. A first sensor is configured to determine whether the vehicle is in a standstill condition. A controller is operatively connected to the clutch actuator, the transmission actuator and the first sensor. The controller is configured to, in response to the gear change command, set the clutch position between a partially engaged position and a completely released position if the vehicle is standing still as determined by the first sensor.

22 Claims, 10 Drawing Sheets

U.S. PATENT DOCUMENTS

2006/0169569 A1  8/2006  Ooishi et al.

FOREIGN PATENT DOCUMENTS

| | | |
|---|---|---|
| DE | 19709419 | 10/1997 |
| DE | 19853333 | 6/1999 |
| DE | 10107962 | 8/2002 |
| DE | 10327438 | 1/2004 |
| DE | 10304588 | 4/2004 |
| DE | 10253809 A1 | 5/2004 |
| DE | 10306934 | 9/2004 |
| DE | 10393681 | 10/2005 |
| EP | 0129417 | 6/1984 |
| EP | 0328362 | 8/1989 |
| EP | 0590240 | 4/1994 |
| EP | 0635391 | 7/1994 |
| EP | 0887220 | 6/1998 |
| EP | 0987467 | 7/1999 |
| EP | 1122116 | 1/2001 |
| EP | 1342930 A2 | 3/2003 |
| EP | 1365176 | 5/2003 |
| EP | 1555461 | 10/2003 |
| EP | 1469236 | 4/2004 |
| EP | 1666772 | 8/2005 |
| FR | 0 490 730 A1 | 6/1992 |
| GB | 2170571 | 1/1986 |
| JP | 43-11555 | 5/1968 |
| JP | 60-23351 | 7/1983 |
| JP | 58-152938 | 9/1983 |
| JP | 60-86631 | 6/1985 |
| JP | 61-024858 | 2/1986 |
| JP | 62-017631 | 1/1987 |
| JP | 62-80192 | 4/1987 |
| JP | 62-75414 | 5/1987 |
| JP | 62-110532 | 5/1987 |
| JP | 02-118269 | 5/1990 |
| JP | 03-172675 | 7/1991 |
| JP | 03-290030 | 12/1991 |
| JP | 4-266619 | 9/1992 |
| JP | 05-026065 | 2/1993 |
| JP | 05-039865 | 2/1993 |
| JP | 08-061487 | 3/1996 |
| JP | 11-082710 | 3/1999 |
| JP | 3044498 | 3/2000 |
| JP | 2000-205411 | 7/2000 |
| JP | 2001-050389 | 2/2001 |
| JP | 2001-146930 | 5/2001 |
| JP | 2001-173685 | 6/2001 |
| JP | 2001-280493 | 10/2001 |
| JP | 2002-067741 | 3/2002 |
| JP | 2002-243034 | 8/2002 |
| JP | 2003-329064 | 11/2003 |
| JP | 2005-282784 | 10/2005 |
| JP | 2006-017221 | 1/2006 |
| WO | WO 91/10979 | 7/1991 |
| WO | WO 98/24008 | 6/1998 |
| WO | WO 02/25131 | 3/2002 |
| WO | WO 2004/005743 | 1/2004 |
| WO | WO 2004/094177 | 11/2004 |

OTHER PUBLICATIONS

Co-Pending U.S. Appl. No. 11/514,386, filed Aug. 31, 2006. Title: Clutch Control Device and Vehicle.

Co-Pending U.S. Appl. No. 11/514,000, filed Aug. 31, 2006. Title: Automatic Shift Control Device and Vehicle.

Co-Pending U.S. Appl. No. 11/513,609, filed Aug. 31, 2006. Title: Automated Transmission Controller and Vehicle Including the Automated Transmission Controller.

Co-Pending U.S. Appl. No. 11/514,017, filed Aug. 31, 2006. Title: Automated Transmission Controller and Vehicle Including the Automated Transmission Controller.

Co-Pending U.S. Appl. No. 11/513,537, filed Aug. 31, 2006. Title: Automatic Gearshift Control Device and Vehicle.

Co-Pending U.S. Appl. No. 11/469,268, filed Aug. 31, 2006. Title: Clutch Actuator, Engine Unit, and Straddle Type Vehicle.

Co-Pending U.S. Appl. No. 11/469,310, filed Aug. 31, 2006. Title: Clutch Actuator, Engine Unit, and Straddle Type Vehicle.

Co-Pending U.S. Appl. No. 11/469,228, filed Aug. 31, 2006. Title: Clutch Actuator, Engine Unit, and Straddle Type Vehicle.

Co-Pending U.S. Appl. No. 11/469,252, filed Aug. 31, 2006. Title: Shift Actuator, Vehicle and Method of Integrating Vehicle.

Co-Pending U.S. Appl. No. 10/591,285, filed Aug. 31, 2006. Title: Riding Type Vehicle.

Co-Pending U.S. Appl. No. 10/591,559, filed Aug. 31, 2006. Title: Shift Control Device for Straddle-Type Vehicle, and Straddle-Type Vehicle.

Co-Pending U.S. Appl. No. 10/591,284, filed Aug. 31, 2006. Title: Actuation Force Transmission Mechanism and Straddle-Type Vehicle.

Co-Pending U.S. Appl. No. 10/591,560, filed Aug. 31, 2006. Title: Speed Change Controller for Straddle-Ride Type Vehicles.

* cited by examiner

APPARATUS AND METHOD FOR CONTROLLING TRANSMISSION OF STRADDLE-TYPE VEHICLE

RELATED APPLICATIONS

This application is based upon and claims priority to Japanese Patent Application No. 2004-359226, filed on Dec. 10, 2004, which is hereby incorporated by reference in its entirety.

BACKGROUND OF THE INVENTION

1. Field of the Invention

The present invention relates to an apparatus and a method for controlling a transmission for a straddle-type vehicle and, in particular, for controlling a transmission having a dog-clutch mechanism.

2. Description of the Related Art

Some vehicle transmissions have a main shaft connected to an engine's crankshaft via a clutch and a countershaft that outputs the torque of the engine to the wheel. The transmission can also include a first gear having an engaging portion (e.g., dog-teeth in a dog-clutch) and a second gear having engaged portion (e.g., dog-holes in a dog clutch). The main shaft can pass through the first gear, which is rotationally coupled to the main shaft by splines provided on the countershaft. The main shaft also passes through the second gear, which can ride on bearings such that the second gear idles relative to the main shaft. The transmission moves the first gear along the main shaft with a shift fork to bring the second gear into engagement with the first gear, thereby engaging the gears. With respect to a dog-clutch, when the first gear engages the second gear, the dog-teeth in the first gear engage the dog-holes in the second gear.

With such transmissions, when the vehicle is at a standstill, as the dog-tooth gear (i.e., first gear) and the dog-hole gear (i.e., second gear) are brought towards each other, the gears sometimes cannot be engaged because the engagement portions collide. The engagement portions can collide because the rotation of the main shaft stops when the vehicle is standing still causing the dog-teeth to remain offset from the dog-holes. This situation can also occur in electric transmissions when the actuator moves the dog-tooth gear into engagement with the dog-hole gear.

Some conventional electric transmissions have monitored the shifting speed of the dog-tooth gear during gear engagement. For example, when the shifting speed reaches zero the transmission determines that dog collision has occurred. These electric transmissions may rotate the dog-tooth gear or the dog-hole gear by the torque of the motor upon determining that dog collision has occurred, thereby resolving the dog collision.

SUMMARY OF THE INVENTION

The foregoing conventional electric transmissions resolve the dog collision by rotating one of the gears after the dog collision is detected. Accordingly, they often have the problem of taking too much time to bring the dog-tooth gear and the dog-hole gear into complete engagement. Accordingly, there is a need for an apparatus and a method for controlling a transmission of a straddle-type vehicle, to quickly bring a gear having a dog-clutch engaging portion and a gear having a dog-clutch engaged portion into engagement with each other, even when dog collision has occurred.

According to one aspect of the present invention a transmission control apparatus is provided for a straddle-type vehicle having a clutch and a transmission with a dog clutch having a first gear and a second gear. The apparatus includes means for determining whether the vehicle is standing still. The apparatus also includes means for setting the clutch in a predetermined position that is between a partially engaged position and a completely released position when the vehicle is determined to be standing still and in response to an instruction to engage an engaging portion of the first gear with an engaged portion of the second gear.

According to another aspect of the present invention a method is provided for controlling the transmission of a straddle-type vehicle having a clutch and a transmission with a dog clutch having a first gear and a second gear. In the method, it is determined whether the vehicle is standing still. The clutch position is then set in a predetermined position between a partially engaged position and a completely released position when the vehicle is determined to be standing still and in response to an instruction to engage an engaging portion of the first gear with an engaged portion of the second gear.

According to another aspect of the present invention a transmission control apparatus is provided for a straddle-type vehicle that has a clutch and a transmission with a dog clutch having a first gear and a second gear. The transmission control apparatus includes a clutch actuator configured to engage and disengage the clutch. A transmission actuator is configured to change a gear of the transmission. An input device is configured to generate a gear change command. A first sensor is configured to determine whether the vehicle is in a standstill condition. A controller is operatively connected to the clutch actuator, the transmission actuator and the first sensor. The controller is configured to, in response to the gear change command, set the clutch position between a partially engaged position and a completely released position if the vehicle is standing still as determined by the first sensor.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE PREFERRED EMBODIMENTS

Figure 1:
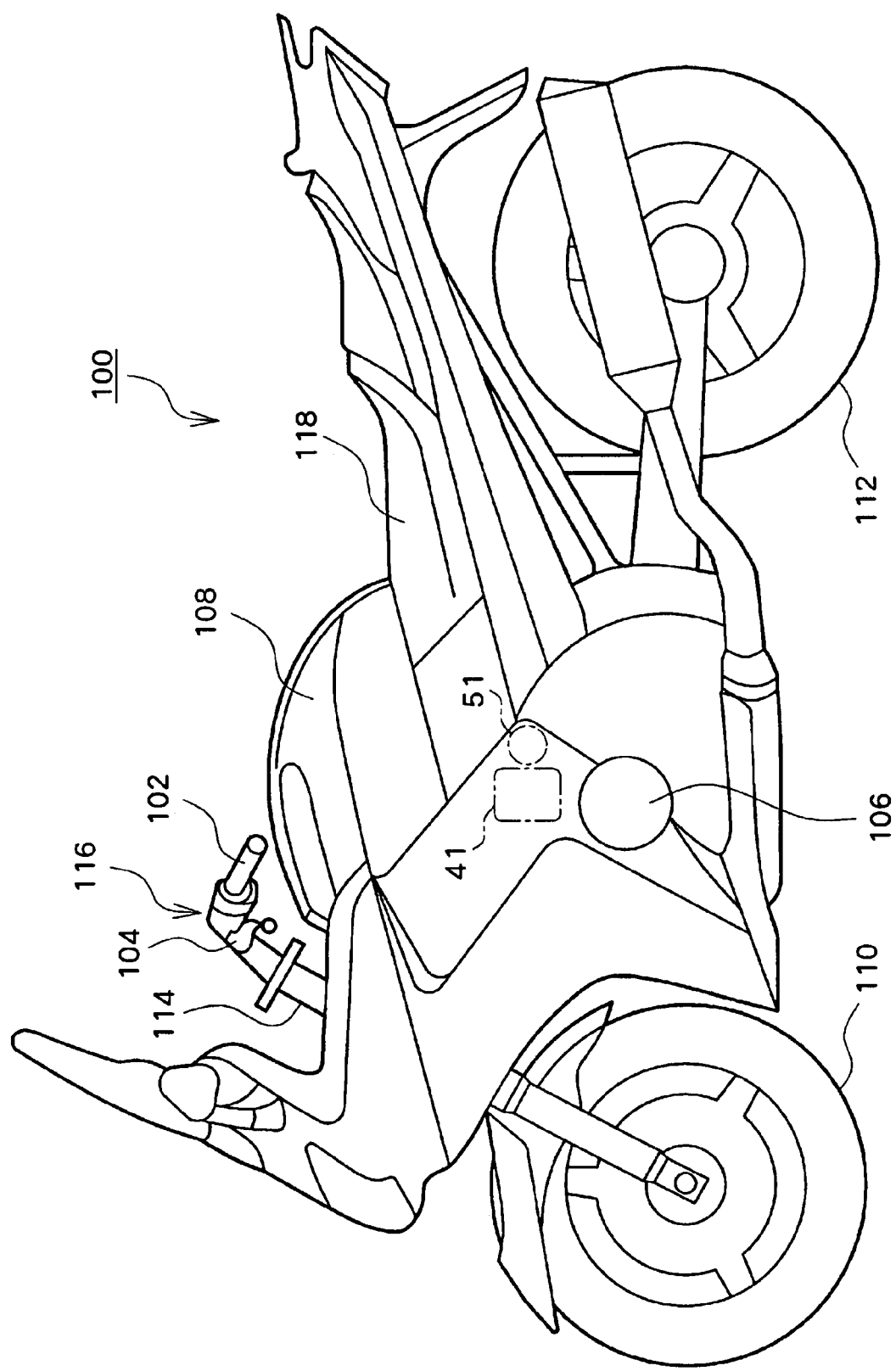
FIG. 1 is an external side view of a motorcycle (straddle-type vehicle) according to one embodiment of the invention.

FIG. 1 is an external side view of a motorcycle according to one embodiment of the invention. The motorcycle 100 shown in the drawing is one form of a straddle-type vehicle. Straddle-type vehicles include motorcycles (including motor bicycles (motorbikes) and scooters), four-wheel buggies (all-terrain vehicles), and snow mobiles. When operating straddle-type vehicles, riders frequently start and stop the vehicles movement. Thus, the following description of the present transmission in the context of a motorcycle is merely an example of one type of vehicle on which the present transmission control apparatus can be employed.

The illustrated motorcycle 100 preferably includes a transmission control apparatus, which is configured in accordance with a preferred embodiment, to allow for quick, smooth gear shifting and to thereby improve the handling comfort of the motorcycle 100. The basic structure of the motorcycle 100 will first be described, before describing the transmission control apparatus.

In the illustrated embodiment, the motorcycle 100 includes a front wheel 110 and a rear wheel 112. A handlebar 116 extends laterally with respect to the direction of the travel of the vehicle and is mounted to the top of a front fork 114. The front fork 114 straddles the front wheel 110 and is coupled to its axle. The handlebar 116 has a grip 102 and a clutch lever 104 at one end and has an accelerator grip and a brake lever (not shown) at the other end. A seat 118 is provided preferably on the top side of the motorcycle 100. A rider can ride on the seat 118 of the motorcycle 100. Much of the structure of the motorcycle 100 is substantially the same as that of known street-type motorcycles.

In accordance with one embodiment, a clutch actuator 41 for actuating a clutch, which is disposed in the crankcase of an engine 106, is disposed above the engine 106 and below a fuel tank 108. The motorcycle 100 also preferably includes a shift actuator 51 for actuating a transmission disposed in the transmission case of the engine 106. The action of the clutch actuator 41 is controlled by a transmission control apparatus 10 (see FIG. 2). The application and release of the clutch are executed by the clutch actuator 41. The action of the shift actuator 51 is also controlled by the transmission control apparatus 10. The gear shifting of the transmission is executed by the shift actuator 51. The clutch lever 104 controls the clutch actuator 41 during at least some operating conditions to provide for manual control of the application and release of the clutch.

Figure 2:
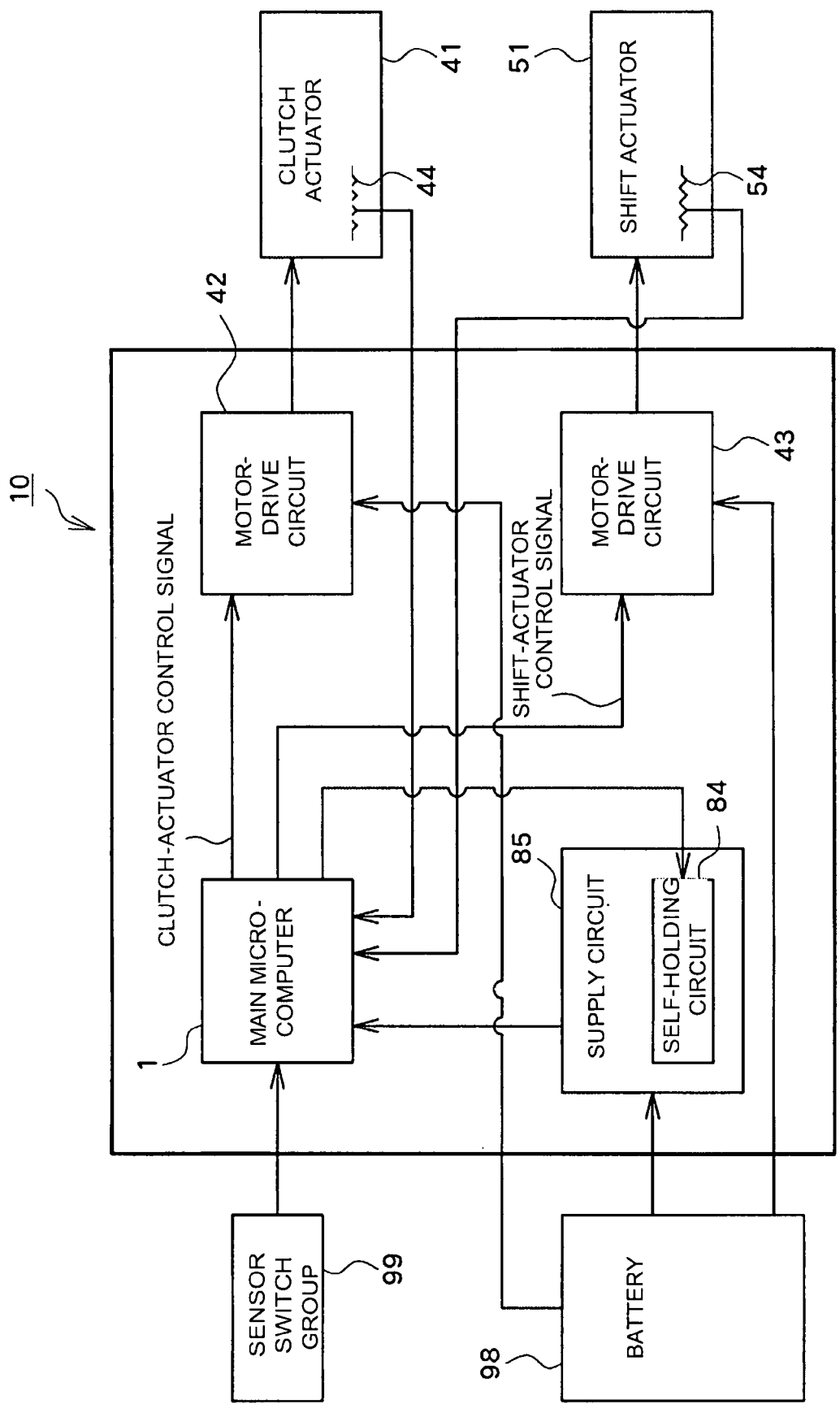
FIG. 2 is a block diagram of the overall structure of a control system mounted to the motorcycle.

FIG. 2 is a block diagram of at least a portion of the structure for a control system, which is mounted to the motorcycle 100. The control system includes the transmission control apparatus 10, the clutch actuator 41, the shift actuator 51, a sensor switch group 99, a clutch (not shown), and a variable-speed transmission (not shown).

The transmission control apparatus 10 is operatively connected to a battery 98. The power of the battery 98 is supplied to the transmission control apparatus 10. The power is also selectively supplied to the clutch actuator 41 and the shift actuator 51 via the transmission control apparatus 10.

In this application, various components are described as being "operatively connected" to the control unit. It should be appreciated that this is a broad term that includes physical connections (e.g., electrical wires) and non-physical connections (e.g., radio or infrared signals). It should also be appreciated that "operatively connected" includes direct connections and indirect connections (e.g., through an additional intermediate device).

The clutch actuator 41 preferably includes a DC motor. The clutch actuator 41 can release the clutch by rotating the DC motor in a normal direction. The clutch actuator 41 can bring the clutch into engagement by rotating the DC motor in a reverse direction. The clutch actuator 41 can also set the clutch in a desired position between the released position and the engaged position. The clutch actuator 41 includes a clutch sensor 44 to indicate the position of the clutch. The clutch sensor 44 preferably is a potentiometer including a resistor. A voltage indicative of the condition of the clutch actuator 41, e.g., a voltage indicative of a clutch position, is provided to the transmission control apparatus 10. The voltage value is used by the transmission control apparatus 10 as a clutch position info indicator. Other forms of a signal (e.g., a digital value) can be sent to the transmission control apparatus 10.

In a similar manner, the shift actuator 51 can also include a DC motor, to allow for shifting-up or down by rotating the DC motor in a normal direction or a reverse direction. The shift actuator 51 preferably is mounted to the shift arm of the transmission. The shift arm can be rotated in one direction by rotating the DC motor in the normal direction, and the shift arm can be rotated in the reverse direction by reversing the rotation of the DC motor. The shift actuator 51 has a shift potentiometer 54 including a resistor. A voltage indicative of the condition of the shift actuator 51, e.g., a voltage indicative of the rotation angle of the shift arm, is applied to the transmission control apparatus 10. The voltage value can be used the transmission control apparatus 10 to indicate shift-actuator-rotation-angle.

Figure 3:
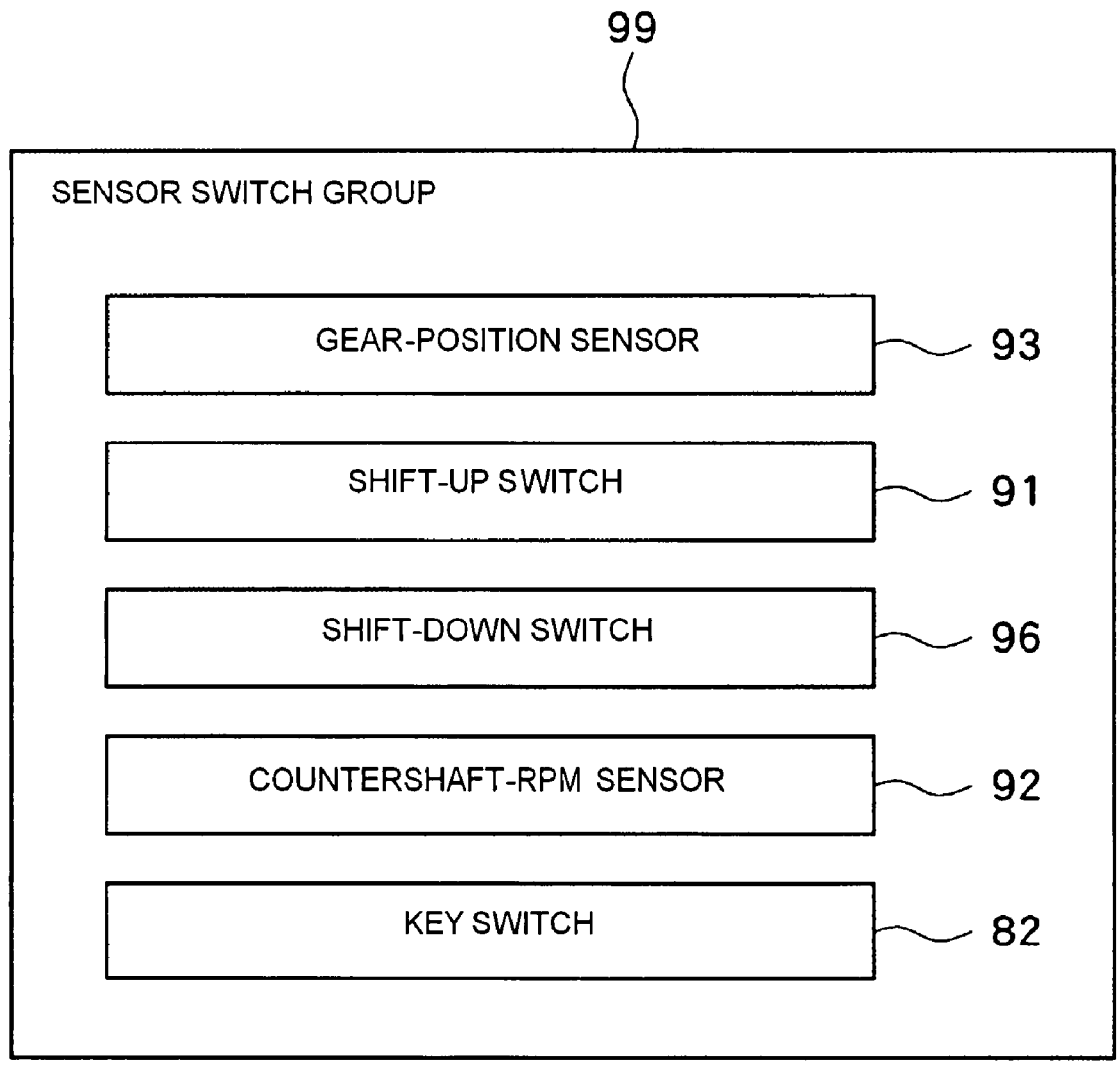
FIG. 3 is a block diagram of a sensor switch group.

As shown in FIG. 3, in the illustrated embodiment, the sensor switch group 99 includes a shift-up switch 91, a shift-down switch 96, a gear-position sensor 93, a countershaft-RPM sensor 92, and a key switch 82.

The shift-up switch 91 inputs gear-shift-instruction information indicative of rider's shift-up instruction to the main microcomputer 1 of the transmission control apparatus 10. Similarly, the shift-down switch 96 inputs gear-shift-instruction information indicative of rider's shift-down information to the main microcomputer 1. The gear-position sensor 93 preferably is mounted to the transmission, and inputs a voltage value corresponding to the rotation angle of the shift cam shaft to the main microcomputer 1 as gear-position information. The countershaft-RPM sensor 92 preferably is mounted to the countershaft of the transmission and outputs a pulse signal to the main microcomputer 1 as countershaft-RPM information at a frequency corresponding to the RPM of the countershaft. The main microcomputer 1 preferably determines whether the vehicle is standing still from the countershaft-RPM information. When the key of the motorcycle 100 is inserted into the switch 82 and is turned on, the key switch 82 outputs a signal indicative of that (a switch-on signal) to the main microcomputer 1. When the switch-on signal is inputted, the main microcomputer 1 is started.

Referring back to FIG. 2, the transmission control apparatus 10 preferably comprises the main microcomputer 1. The main microcomputer 1 preferably controls the action of the clutch actuator 41 and the shift actuator 51 according to the information indicative of the condition of the vehicle which is input from the sensor switch group 99, the clutch potentiometer 44, and the shift potentiometer 54.

With reference back to FIG. 2, the transmission control apparatus 10 is a feedback control device that can include of one or more hard-wired circuits, dedicated processors and memory, and/or a general purpose processor and memory running one or a plurality of control programs. In the illustrated embodiment, the transmission control apparatus 10 preferably comprises the main microcomputer 1, which can utilize or calculate various control maps or formulas (e.g., correlations of reference control signals to various operating conditions of the engine or other fundamental engine control data) that may be stored in advance in a storage device (e.g., ROM). For example, as will be explained in detail below, the main microcomputer 1 preferably controls the action of the clutch actuator 41 and the shift actuator 51 according to the information indicative of the condition of the vehicle which is input from the sensor switch group 99, the clutch potentiometer 44, and the shift potentiometer 54. In modified embodiments, the transmission control apparatus 10 and/or one or more of its components can be part of other control systems of the motorcycle 10 or the general control system of the motorcycle 100. In addition, various components, functions and aspects of the transmission control apparatus 10 and its components may be grouped and/or separated into sub-devices or separate devices. For easier understanding of the reader, the units or sections of the microcomputer will be described as if they were discriminate and substantial units. However, in other embodiments, the units or sections can be combined or divided in various combinations.

The components of the transmission control apparatus 10 will be described hereinbelow. The transmission control apparatus 10 preferably includes the main microcomputer 1, a supply circuit 85, a motor-drive circuit 42 that supplies power to activate the clutch actuator 41, and a motor-drive circuit 52 that supplies power to activate the shift actuator 51.

The supply circuit 85 includes a switch (not shown) that is turned on in conjunction with the key switch 82 and a self-holding circuit 84. When the switch is turned on, the supply circuit 85 converts the voltage of the battery 98 to a voltage for driving the main microcomputer 1 and starts to apply the voltage to the main microcomputer 1. After the key switch 82 is turned off, the switch maintains the on-state by the self-holding circuit 84. The supply circuit 85 continues the application of the driving voltage until the shut-down operation of the main microcomputer 1 is completed. Upon completion of the shut-down operation, the main microcomputer 1 instructs the self-holding circuit 84 to stop power supply, so that the power supply from the supply circuit 85 to the main microcomputer 1 is stopped.

The motor-drive circuit 42 preferably includes an H-bridge circuit, through which a current from the battery 98 is supplied. The motor-drive circuit 42 supplies a current that rotates the DC motor of the clutch actuator 41 to the DC motor in a direction and at a speed according to a clutch-actuator control signal supplied from the main microcomputer 1. The motor-drive circuit 52 preferably also includes an H-bridge circuit, through which a current from the battery 98 is supplied. The motor-drive circuit 52 supplies a current that rotates the DC motor of the shift actuator 51 to the DC motor in a direction and at a speed according to a shift-actuator control signal supplied from the main microcomputer 1.

The main microcomputer 1 comprises a computer. The computer controls the action of the clutch actuator 41 and the shift actuator 51 according to the information indicative of the condition of the vehicle which is input from the sensor switch group 99, the clutch potentiometer 44, and the shift potentiometer 54. The application and release of the clutch are achieved by the action of the clutch actuator 41. The gear-shifting is achieved by the action of the shift actuator 51.

Figure 4:
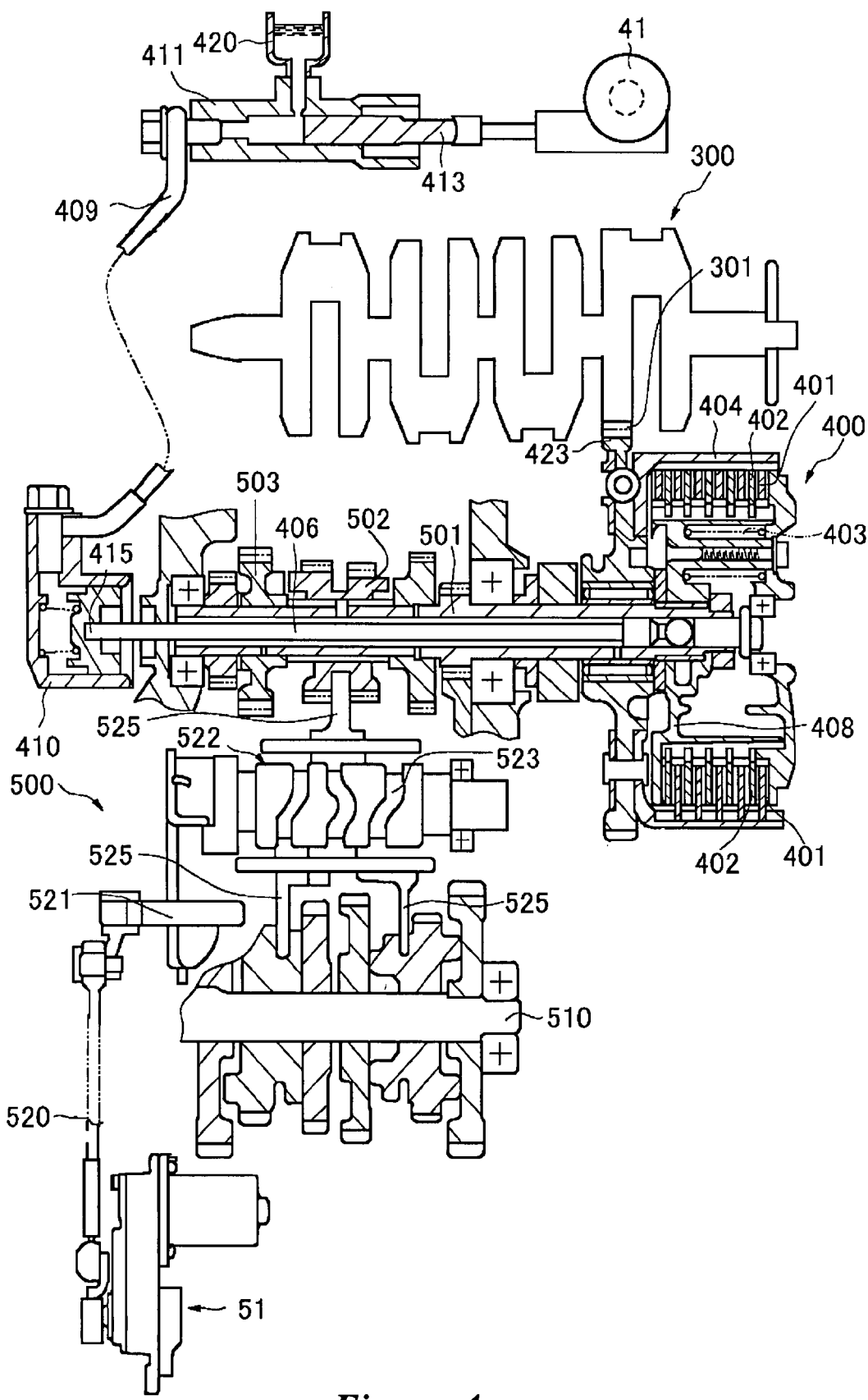
FIG. 4 is a cross-sectional view of a clutch and a transmission.

A clutch 400 and a transmission 500 will now be described. FIG. 4 is a cross-sectional view of the clutch 400 and the transmission 500. The clutch 400 preferably is a multiplate wet clutch, which is filled with a lubricant (e.g., oil). This increases the durability of the clutch and smoothes the application and release of the clutch. As shown in FIG. 4, the clutch 400 includes a clutch housing 404, around which a primary driven gear 423 is provided. The primary driven gear 423 is in engagement with a primary drive gear 301 of a crank 300. The clutch housing 404 rotates with the crank 300. The clutch 400 includes alternating friction discs 401 and clutch discs 402. The friction discs 401 rotate as the clutch housing 404 rotates to slide axially. The clutch discs 402 connect to a clutch boss 408 with a spline. The clutch boss 408 connects to a main shaft 501 with a spline. Thus, the clutch discs 402 rotate independently from the clutch housing 404, and can slide axially in the same way as the friction discs 40. The main shaft 501 rotates with the clutch discs 402.

When the clutch is in an engaged state, the friction discs 401 and the clutch discs 402 are pushed toward the transmission 500 by the spring force of the clutch spring 403 to generate frictional forces. Thus, the driving force of the engine is transmitted to the main shaft 501 via the crank 300, the clutch housing 404, the friction discs 401, and the clutch discs 402 with the clutch in an engaged state. On the other hand, when the clutch is in a released state, a force against the clutch spring 403 is applied from a push rod 406 toward the clutch 400. Thus the friction discs 401 and the clutch discs 402 are separated to shut the transmission of the driving force of the engine to the main shaft 501. When the clutch is in a partly engaged state, the friction discs 401 and the clutch discs 402 are in contact to transmit part of the driving force of the engine, allowing the traveling of the vehicle.

The push rod 406 is pushed to the clutch 400 by the action of the clutch actuator 41 via a hydraulic mechanism. The clutch is set to a completely released position, an engaged position, or a desired position between the completely released position and the engaged position according to the action of the clutch actuator 41. More specifically, the hydraulic mechanism includes an lubricant hose 409 for circulating lubricant, a clutch-release cylinder 410 connected to one end of the lubricant hose 409, and a master cylinder 411 connected to the other end. As the clutch actuator 41 rotates, the piston 413 is pushed to the master cylinder 411. As the piston 413 is pushed, lubricant in the master cylinder 411 passes through the lubricant hose 409 into the clutch-release cylinder 410. As the lubricant flows in, the piston 415 is pushed to the push rod 406, so that the push rod 406 is pushed to the clutch. In this way, the amount of lubricant flowing into the clutch-release cylinder 410 is varied according to the action of the clutch actuator 41, so that the clutch position can be set in a completely released position, an engaged position, or a desired position between the completely released position and the engaged position. The master cylinder 411 includes a reservoir tank 420, which works to correct changes in the volume of the lubricant in the hydraulic mechanism.

The transmission 500 is a transmission having a dog clutch, which includes a main shaft 501 and a countershaft 510 parallel to the main shaft 501. A gear 502 having a dog-clutch engaging portion (a dog-tooth gear) and a gear 503 having a dog-clutch engaged portion (dog-holes) are coupled to the main shaft 501. The dog-tooth gear 502 can slide along the axis of the main shaft 501, and is coupled to the main shaft 501 through a spline. The dog-hole gear 503 idles on the main shaft 501. The driving force of the engine is transmitted through the clutch 400 and the main shaft 501 to the dog-tooth gear 502. The dog-tooth gear 502 slides toward the dog-hole gear 503 into engagement therewith, so that the driving force of the engine is transmitted to the dog-hole gear 503.

A plurality of gears are carried on the countershaft 510. The gears can be coupled to the countershaft 510 with a spline. The gears can be in engagement with the dog-tooth gear 502 or the dog-hole gear 503 of the main shaft 501. The driving force of the engine is transmitted to the countershaft 510 via the dog-tooth gear 502 or the dog-hole gear 503 and some of the gears coupled to the countershaft 510. FIG. 4 shows the main shaft 501 and the countershaft 510 separately for the sake of simplification. For vehicles using a chain drive system, the driving force transmitted to the countershaft 510 is transferred to the rear wheel via a drive sprocket (not shown) mounted to one end of the countershaft 510 and a chain wound around the drive sprocket, thereby driving the vehicles. For vehicles using a belt drive system, the driving force transmitted to the countershaft 510 is transferred to the rear wheel via a drive pulley (not shown) mounted to one end of the countershaft 510 and a belt wound around the drive pulley. For vehicles using a shaft drive system, a bevel gear (not shown) is disposed at one end of the countershaft 510. The bevel gear and a bevel gear disposed at one end of a drive shaft (not shown) come into engagement with each other, so that the driving force transmitted to the countershaft 510 is transferred to the rear wheel via the drive shaft.

The dog-tooth gear 502 coupled to the main shaft 501 and the gear coupled to the countershaft 510 slide on the respective shafts by the action of the shift actuator 51. Specifically, the shift rod 520 mounted to the shift actuator 51 connects to a shift arm 521. The shift cam shaft 522 is in engagement with the shift arm 521 and rotates around the shift cam shaft 522. The shift cam shaft 522 has a cam groove 523. As the shift cam shaft 522 rotates, a shift fork 525 slides along the axis of the shift cam shaft along the cam groove 523. Thus, the dog-tooth gear 502 that comes into engagement with the shift fork 525, or the gear coupled to the countershaft 510, slides on the respective shafts to a position corresponding to gear shifting. Gear shifting is thus achieved by the action of the shift actuator 51.

When the dog-tooth gear 502 slides toward the dog-hole gear 503 without rotating around the axis of the main shaft 501, the dog teeth of the dog-tooth gear 502 and the dog holes of the dog-hole gear 503 are not always aligned with each other resulting in dog collision and preventing smooth gear shifting. According to one embodiment, dog collision can be prevented by rotating the dog-tooth gear 502 before dog collision occurs.

Specifically, the clutch 400 is filled with lubricant. Accordingly, even if the clutch discs 402 and the friction discs 401 are not in contact with each other, the clutch discs 402 can be operatively associated with the friction discs 401 through the viscosity of the lubricant. The space between the clutch discs 402 and the friction discs 401 preferably can be set so that the discs are not brought into contact with each other and yet the clutch discs 402 and the friction discs 401 are positioned close enough together when a gear-shift instruction is given with the vehicle at standstill so that the discs operate together through the lubricant to transmit a driving force. Thus, from the driving force of the engine, a driving force smaller than that necessary for driving the vehicle is transmitted to the main shaft 501. In one embodiment, the driving force is smaller than that necessary for driving the vehicle when the brakes are not on and, in another embodiment, the driving force is smaller than necessary for driving the vehicle when the brakes are on. As a result, the main shaft 501 rotates, and the dog-tooth gear 502 coupled to the main shaft 501 moves together with the main shaft 501 even while the vehicle is standing still. Since the dog-tooth gear 502 approaches the dog-hole gear 503 while rotating, the dog collision, if it occurs at all, can be resolved quickly.

After the dog-tooth gear 502 and the dog-hole gear 503 have been brought into engagement to complete gear shifting, the rotation of the dog-tooth gear 502 stops, so that the vehicle remains standing still. That is because the clutch discs 402 and the friction discs 401 are not in contact and so a driving force sufficient to drive the vehicle (with or without the brakes activated) is not transmitted to the main shaft 501. Accordingly, the vehicle remains standing still.

Figure 5:
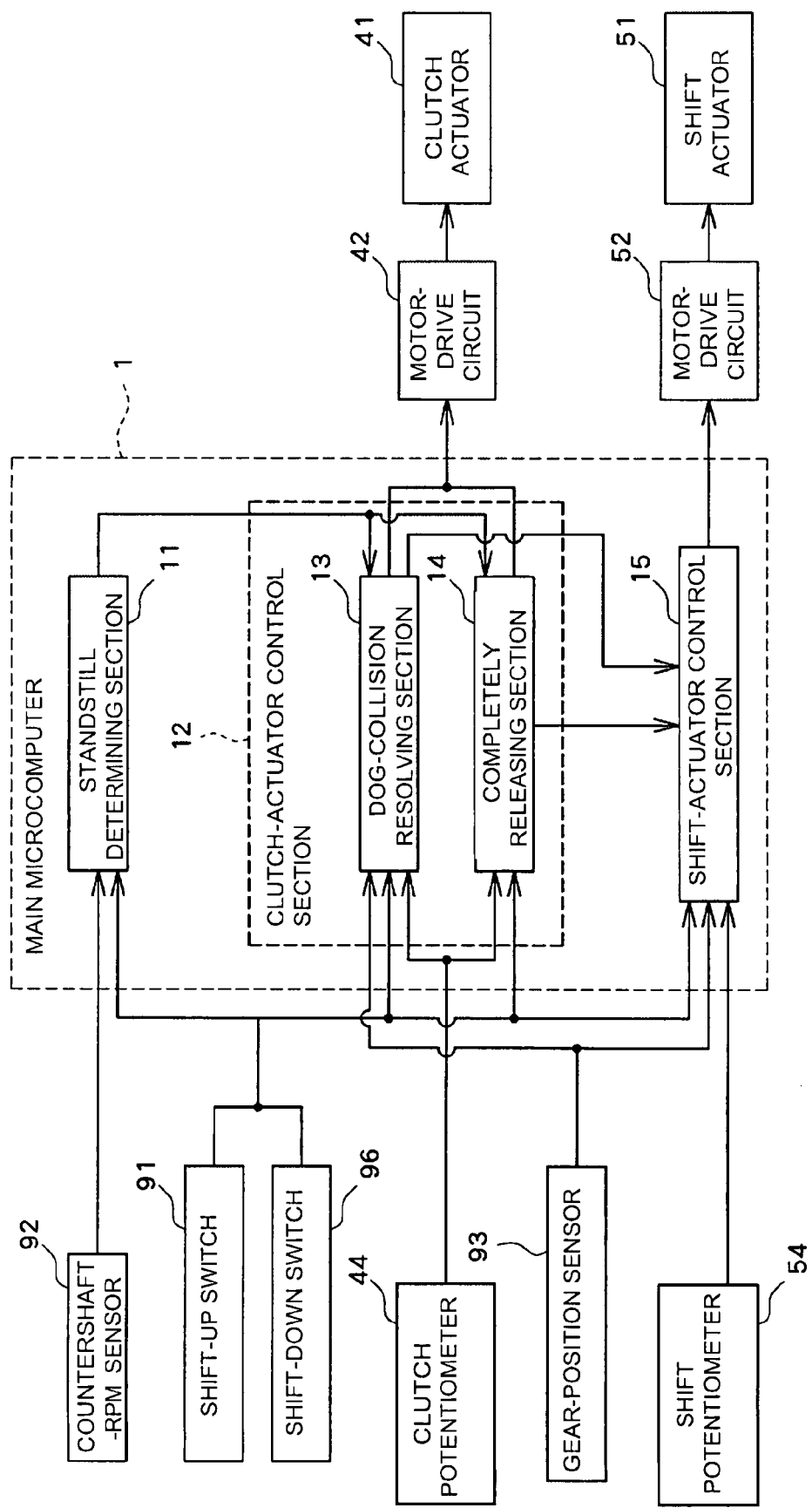
FIG. 5 is a functional block diagram of a main microcomputer.

An embodiment of the function of the main microcomputer 1 of the transmission control apparatus 10 for controlling the clutch actuator 41 and the shift actuator 51 will be described. FIG. 5 is a functional block diagram of the main microcomputer 1, showing the function according to one embodiment of the invention. The main microcomputer 1 includes a standstill determining section 11, a clutch-actuator control section 12, and a shift-actuator control section 15. The functional components will be described below.

The standstill determining section 11 determines whether the vehicle is standing still. Specifically, when the key switch 82 is turned on and then gear-shifting operation is made by a rider, gear-shift-instruction information is inputted to the standstill determining section 11 from the shift-up switch 91 or the shift-down switch 96. The standstill determining section 11, which has obtained the gear-shift-instruction information, then obtains countershaft-RPM information from the countershaft-RPM sensor 92. When the RPM of the countershaft is a predetermined value (standstill-condition RPM) or less, and the RPM lower than the standstill-condition RPM is continued for a predetermined time (standstill-condition time) or more, the standstill determining section 11 determines that the vehicle is standing still. The standstill determining section 11 sends the determination to a dog-collision resolving section 13 and a completely releasing section 14 that constitute the clutch-actuator control section 12.

The clutch-actuator control section 12 obtains gear-shift-instruction information from the shift-up switch 91 or the shift-down switch 96. The clutch-actuator control section 12, which has received the notice that the vehicle is standing still from the standstill determining section 11 and obtained the gear-shift-instruction information, executes two kinds of controls of the clutch actuator 41 according to the clutch position with the vehicle at standstill. Specifically, when the clutch with the vehicle at standstill is set in a completely released state, the dog-collision resolving section 13 of the clutch-actuator control section 12 controls the clutch actuator 41. On the other hand, when the clutch with the vehicle at standstill is set in an engaged state, the completely releasing section 14 of the clutch-actuator control section 12 controls the clutch actuator 41.

The function of the dog-collision resolving section 13 will first be described. The dog-collision resolving section 13 shifts the clutch from a completely released position to a dog-collision-resolving clutch position when a gear-shift instruction is made while the vehicle is standing still. When the gear shifting has been completed, the dog-collision resolving section 13 shifts the clutch to the completely released position again.

The dog-collision-resolving clutch position set by the dog-collision resolving section 13 will be described. The clutch position is roughly classified into an engaged position, a partially engaged position, and a released position depending on the ratio of transmission of the engine torque to the main shaft 501. However, the ratio of transmission of the engine torque to the main shaft 501 differs in the clutch positions, depending on the space between the friction discs 401 and the clutch discs 402. For example, the space between the friction discs 401 and the clutch discs 402 is the maximum in the completely released position. In this state, the transmission of the engine torque to the main shaft 501 is completely interrupted. By gradually decreasing the space between the friction discs 401 and the clutch discs 402, the amount of engine toque transmitted to the main shaft 501 increases gradually due to the viscosity of the lubricant in the clutch 400 even in a released position. At the time the friction discs 401 and the clutch discs 402 come into contact with each other, the clutch comes to a partially engaged position.

The dog-collision-resolving clutch position of this embodiment is a position where the friction discs 401 and the clutch discs 402 are not in contact but the clutch discs 402 is operatively associated with the rotation of the friction discs 401 due to the viscosity of the lubricant in the clutch 400. The dog-collision-resolving clutch position is set larger than the partially engaged position, allowing the main shaft 501 to rotate by the engine torque before the dog-tooth gear 502 and the dog-hole gear 503 come into engagement. Setting the clutch to the dog-collision-resolving clutch position allows the main shaft 501 to rotate by the engine toque with the vehicle at standstill.

Referring to FIG. 6(a), the function of the dog-collision resolving section 13 will be described in detail. FIG. 6(a) shows the temporal change of the clutch position when a shift-up instruction is given when the clutch with the vehicle at standstill is in a completely released position. The horizontal axis of the graph indicates time. The vertical axis indicates the clutch position. The clutch position is roughly classified into an engaged position, a partially engaged position, and a released position, as described above. Symbol C1 in the graph indicates a clutch position in a completely released position, and C2 indicates a dog-collision-resolving clutch position. As shown in the graph, the dog-collision-resolving clutch position C2 is set larger than the partially engaged position, and smaller than the completely released position C1.

The dog-collision resolving section 13, which has received the notice that the vehicle is standing still from the standstill determining section 11, obtains clutch-position information from the clutch potentiometer 44. The dog-collision resolving section 13, which has determined that the clutch is in a completely released position from the clutch-position information, starts to shift the clutch from the completely released position to a dog-collision-resolving clutch position (dog-collision-resolving operation, refer to FIG. 6(a)) at the same time as gear-shift-instruction information is given. Specifically, the gear shifting is achieved in such a way that the dog-collision resolving section 13 outputs a clutch-actuator control signal to the motor-drive circuit 42 to activate the clutch actuator 41. When the dog-collision resolving section 13 starts a dog-collision-resolving operation, the shift-actuator control section 15 is notified of it, as will be described later.

In the dog-collision-resolving operation, the dog-collision resolving section 13 obtains clutch-position information to monitor the clutch position. The dog-collision resolving section 13 stops the action of the clutch actuator 41 at the time the clutch reaches a dog-collision-resolving clutch position (clutch position C2 in FIG. 6(a)) to complete the dog-collision-resolving operation (t2 in FIG. 6(a)).

The dog-tooth gear 502 shifts toward the dog-hole gear 503 by the action of the shift actuator 51, which will be described later, after the clutch is set to the dog-collision-resolving clutch position. The dog teeth of the dog-tooth gear 502 and the dog holes of the dog-hole gear 503 are brought into engagement with each other, so that the shifting of the dog-tooth gear 502 is completed.

The dog-collision resolving section 13 obtains gear-position information from the gear-position sensor 93 after the dog-collision-resolving operation has been started. The dog-collision resolving section 13 determines whether the shifting of the dog-tooth gear 502 has been completed according to the gear-position information. At the time the dog-tooth gear 502 and the dog-hole gear 503 have come into engagement and the shift cam shaft has reached a rotation angle corresponding to the gear shifting required by a gear-shift instruction, the dog-collision resolving section 13 determines that the shifting of the dog-tooth gear 502 has been completed.

The dog-collision resolving section 13, which has determined that the shifting of the dog-tooth gear 502 has been completed, activates the clutch actuator 41 to shift the clutch to the completely released position again (dog-collision-resolving returning operation, t6 in FIG. 6(a)). In the dog-collision-resolving returning operation, the dog-collision resolving section 13 monitors the clutch position according to clutch-position information, as in the dog-collision resolving operation. The clutch actuator control section 12 stops the action of the clutch actuator 41 at the time the clutch position reaches a completely released position to complete the dog-collision-resolving returning operation (t7 in FIG. 6(a)).

As has been described, the dog-collision resolving section 13 executes the dog-collision resolving operation at the time a gear-shift instruction is given by the rider. After the clutch reaches the dog-resolving clutch position by the action of the shift actuator 51, which will be described later, the dog-tooth gear 502 starts to shift toward the dog-hole gear 503. Accordingly, the dog-tooth gear 502 moves with the rotation of the main shaft 501 to come close to the dog-hole gear 503 while rotating. As a result, even if dog collision occurs, the dog collision can be resolved quickly, allowing smooth gear shifting.

The function of the completely releasing section 14 will next be described. The completely releasing section 14 shifts the clutch from an engaged position to a completely released position when the clutch is in an engaged position with the vehicle at standstill. Upon completion of gear shifting, the completely releasing section 14 shifts the clutch from the completely released position to a standstill clutch position. In the completely released position, the transmission of the engine torque to the main shaft 501 is completely interrupted, as described above, so that the RPM of the main shaft 501 decreases gradually. The standstill clutch position is set smaller than the completely released position, and larger than a partially engaged position. Setting the clutch position with the vehicle at standstill to the standstill clutch position allows the clutch to be engaged at the start of the vehicle in a shorter time than when the clutch position is set in the completely released position.

Referring to FIG. 8(a), the function of the completely releasing section 14 will be described in more detail. FIG. 8(a) shows the temporal change of the clutch position when an instruction to shift the gear from neutral to first gear is given with the clutch of the vehicle at standstill in an engaged position. Symbol C1 in FIG. 8(a) indicates a clutch position in an engaged state, C2 indicates a clutch position in a completely released state, and C3 indicates a standstill clutch position. The vertical axis indicates the clutch position. The horizontal axis indicates time.

The completely releasing section 14, which has received the notice that the vehicle is standing still from the standstill determining section 11, obtains clutch-position information from the clutch potentiometer 44. When the clutch with the vehicle at standstill is in an engaged position, the completely releasing section 14 activates the clutch actuator 41 upon acquisition of gear-shift-instruction information to shift the clutch position from the engaged position to a completely released position (a clutch disengaging operation, refer to FIG. 8(a)). The completely releasing section 14, which has determined that the clutch has reached a completely released position, stops the action of the clutch actuator 41 (t3 in FIG. 8(a)). When the completely releasing section 14 starts the clutch disengaging operation, the shift-actuator control section 15 is notified of it, as will be described later.

After the clutch has been set in a completely released position, the dog-tooth gear 502 shifts toward the dog-hole gear 503 by the action of the shift actuator 51. The dog-tooth gear 502 and the dog-hole gear 503 are brought into engagement, resulting in completion of the shifting of the dog-tooth gear 502.

After the clutch disengaging operation has been started, the completely releasing section 14 obtains gear-position information from the gear-position sensor 93 to determine whether the shifting of the dog-tooth gear 502 has been completed. At the time the dog-tooth gear 502 and the dog-hole gear 503 have come into engagement and the shift cam shaft has reached a rotation angle corresponding to gear shifting required by a gear-shift instruction, the completely releasing section 14 determines that the shifting of the dog-tooth gear 502 has been completed. The completely releasing section 14, which has determined that the shifting of the dog-tooth gear 502 has been completed, starts to shift the clutch from the completely released position to a standstill clutch position (a standstill clutch operation, t6 in FIG. 8(a)). At the time the clutch has reached the standstill clutch position, the completely releasing section 14 stops the action of the clutch actuator 41 (t7 in FIG. 8(a)). The clutch is thus maintained in the standstill clutch position.

As described above, the completely releasing section 14 sets the clutch from an engaged position to a completely released position. After the clutch position has reached a completely released position by the action of the shift actuator 51, the dog-tooth gear 502 and the dog-hole gear 503 come into engagement. Thus the impact to the vehicle at gear shifting is reduced. In other words, when the clutch is in an engaged position with the vehicle at standstill, the driving force of the engine is transmitted to the main shaft 501 via the clutch. The main shaft 501 is operatively associated with the revolution of the engine. In this case, the vehicle is standing still because the gear is set in neutral. When the gear is shifted in this state, the driving force of the engine may be suddenly transmitted to the vehicle to give an impact to the vehicle or stop the engine. Accordingly, this embodiment interrupts the transmission of the driving force of the engine to the main shaft 501 by setting the clutch to a completely released position before the dog-tooth gear 502 and the dog-hole gear 503 come into engagement, and shifts the dog-tooth gear 502 toward the dog-hole gear 503 while gradually reducing the rotation speed of the main shaft 501. As a result, the impact to the vehicle when the dog-tooth gear 502 and the dog-hole gear 503 come into engagement is reduced, so that comfortable gear-shift operation is achieved.

The function of the shift-actuator control section 15 will now be described. When a gear-shift instruction is given by the rider, the shift-actuator control section 15 starts the action of the shift actuator 51 after a lapse of a specified time from the time the gear-shift instruction is given (shift operation), to be described later. The shift actuator 51 rotates to the maximum angle in the shift operation. The maximum shift angle is necessary and sufficient for one shift-up or shift-down operation.

The shifting of the dog-tooth gear 502 is started by the action of the shift actuator 51. After a lapse of a rotation-angle maintaining time from the completion of the shifting, the shift-actuator control section 15 operates the shift actuator 51 in the direction opposite to that of shift operation. At the time the rotation angle of the shift actuator 51 has reached a reference angle, the action of the shift actuator 51 is stopped.

The rotation-angle maintaining time is the time for the shift actuator 51 to maintain the rotation angle at the maximum shift angle to prevent the dog-tooth gear 502 and the dog-hole gear 503 from coming out of engagement from each other. Specifically, when the dog-tooth gear 502 collides with the dog-hole gear 503 strongly to come into engagement therewith, the engagement may sometimes come off by the reaction. Accordingly, the shift actuator 51 maintains the maximum shift angle over the rotation-angle maintaining time, thereby preventing the shift cam shaft from returning to the rotation angle before gear shifting. Thus the dog-tooth gear 502 is urged toward the dog-hole gear, thereby maintaining the engagement of the dog-tooth gear 502 and the dog-hole gear 503.

Referring to FIGS. 6(b) and 8(b), the function of the shift-actuator control section 15 will be described in more detail. FIG. 6(b) shows the temporal change of the rotation angle of the shift actuator 51 when a shift-up instruction is given in the case where the clutch of the vehicle at standstill is in a completely released position. FIG. 8(b) shows the temporal change of the rotation angle of the shift actuator 51 when an instruction to shift the gear from neutral to first gear is given in the case where the clutch of the vehicle at standstill is in an engaged position. The horizontal axes of the graphs indicate time. The vertical axes indicate the rotation angle of the shift actuator 51. The horizontal line in the center of the rotation angle indicates a neutral position (reference angle) where the shift actuator 51 rotates in neither a shift-up direction nor a shift-down direction. Symbol S1 in the graphs indicates the maximum shift angle.

When shifting work is performed by the rider, the shift-actuator control section 15 obtains gear-shift-instruction information from the shift-up switch 91 or the shift-down switch 96. The shift-actuator control section 15, which has obtained the gear-shift-instruction information, is notified of the details of the control of the clutch actuator 41 performed by the clutch-actuator control section 12. More specifically, when the dog-collision resolving section 13 starts a dog resolving operation, the shift-actuator control section 15 is notified of it. On the other hand, when the completely releasing section 14 starts a clutch disengaging operation, the shift-actuator control section 15 is notified of it. The shift-actuator control section 15 thus starts the action of the shift actuator 51 (shift operation) after a lapse of a specified time set on the basis of the control executed by the clutch-actuator control section 12.

More specifically, as shown in FIG. 6(b), when a dog resolving operation is executed by the dog-collision resolving section 13, the shift actuator 51 starts the action after a lapse of dog-collision-resolving control time (T1 in FIG. 6(b)) from the time the gear-shift-instruction information is given (t3 in the graph). On the other hand, as shown in FIG. 8(b), when a clutch-disengaging operation is executed by the completely releasing section 14, the shift actuator 51 starts the action after a lapse of complete-release control time (T2 in FIG. 8(b)) from the time the gear-shift-instruction information is given (t2 in the graph). The control of the action of the shift actuator 51 is achieved in such a way that the shift-actuator control section 15 outputs a shift-actuator control signal corresponding to the action required for the shift actuator 51 to the motor-drive circuit 52.

Here the dog-collision-resolving control time is the time that is predetermined for the dog-tooth gear 502 to start shifting after the clutch reaches the dog-collision-resolving clutch position, in view of the difference in the operation speed between the clutch actuator 41 and the shift actuator 51. Specifically, the clutch actuator 41 and the shift actuator 51 differ in operation speed. Accordingly, if the clutch actuator 41 and the shift actuator 51 are independently operated without consideration of the difference in operation speed, the dog-tooth gear 502 starts shifting before the clutch reaches the dog-collision-resolving clutch position, causing the possibility of dog collision. The embodiment therefore delays the action of the shift actuator 51 from the start of the action of the clutch actuator 41 by a dog-collision-resolving control time from the start of the action of the clutch actuator 41 when a gear-shift instruction is given with the clutch in a completely released position. After the clutch has reached the dog-collision-resolving clutch position, the shifting of the dog-tooth gear 502 is started.

Likewise, the complete-release control time is the time that is predetermined to bring the dog-tooth gear 502 and the dog-hole gear 503 into engagement after the clutch reaches a completely released position to reduce the rotation speed of the main shaft 501, in view of the difference in the operation speed between the clutch actuator 41 and the shift actuator 51.

The shift-actuator control section 15 obtains shift-actuator-rotation-speed information from the shift potentiometer 54 during the shifting action of the shift actuator 51. The shift-actuator control section 15 monitors the rotation angle of the shift actuator 51 on the basis of the shift-actuator-rotation-speed information. At the time it is determined that the shift actuator 51 has reached the maximum shift rotation angle (S1 shown in FIGS. 6 and 8), the shifting operation is completed (t5 in FIGS. 6 and 8).

During the shifting operation, the shift cam shaft is rotating by the action of the shift actuator 51. The dog-tooth gear 502 that is to come into engagement with the shift fork moves on the main shaft 501 toward the dog-hole gear 503. The shift-actuator control section 15 obtains gear-position information from the gear-position sensor 93 from the start of shift operation, and determines whether the shifting of the dog-tooth gear 502 has been completed from the gear-position information. The shift-actuator control section 15 determines that the shifting of the dog-tooth gear 502 is completed at the time the dog-tooth gear 502 and the dog-hole gear 503 have come into engagement and the shift cam shaft has reached a rotation angle corresponding to the gear shift required by a gear-shift instruction.

Figure 6:
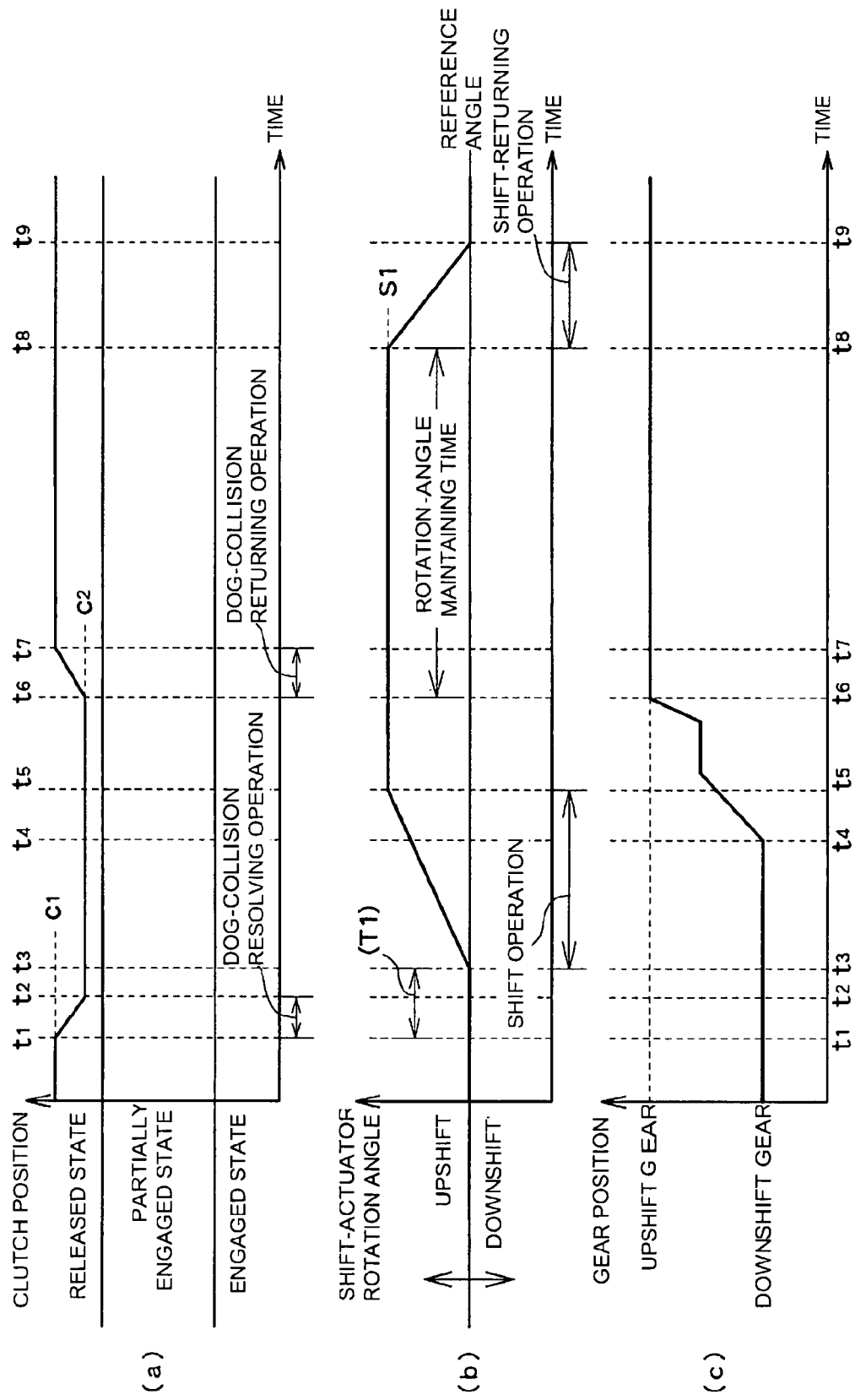
FIG. 6 is a graph showing the temporal change of the clutch position, the rotation angle of a shift actuator, and the position of the gear for a shifting-up operation.
Figure 8:
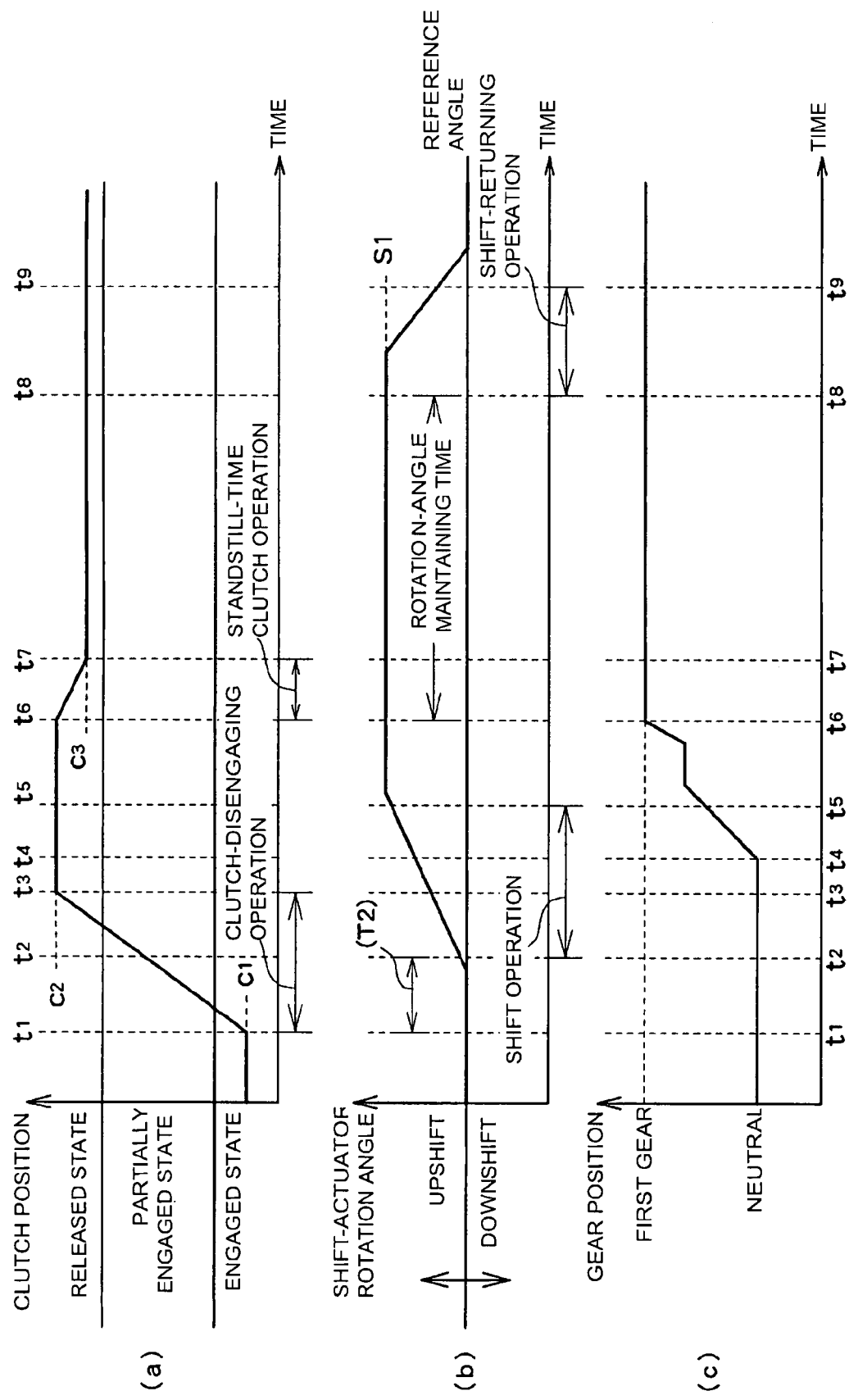
FIG. 8 is a graph showing the temporal change of the clutch position, the rotation angle of the shift actuator, and the position of the gear when the gear is shifted from neutral to first.

The shift-actuator control section 15, which has determined that the shifting of the dog-tooth gear 502 has been completed, continues to maintain the rotation angle of the shift actuator 51 at the maximum rotation angle from that time to the lapse of the rotation-angle maintaining time (refer to FIGS. 6 and 8). Then the shift-actuator control section 15 operates the shift actuator 51 in a direction back to the reference angle after the lapse of the rotation-angle maintaining time (shift-returning operation, refer to t8 in FIGS. 6 and 8). In the shift-returning operation, the shift-actuator control section 15 determines whether the shift actuator 51 has reached the reference angle on the basis of the shift-actuator-rotation-speed information. The shift-returning operation is completed at the time the shift-actuator control section 15 has determined that the shift actuator 51 has reached the reference angle (t9 in FIGS. 6 and 8). Thus, the shift actuator 51 is maintained at the reference angle.

In this embodiment, the difference in operation speed is controlled in such a way that the action of the shift actuator 51 is delayed from the start of the action of the clutch actuator 41. However when the operation speed of the clutch actuator 41 is higher than that of the shift actuator 51, such control may not be necessary or, alternatively, the action of the shift actuator 51 may be started earlier than that of the clutch actuator 41.

In this embodiment, the dog-collision-resolving control time is predetermined on the basis of the details of the control of the clutch-actuator control section 12. Alternatively, the dog-collision-resolving control time may be set for each speed. For example, different dog-collision-resolving control times may be set for gear shifting from first to second gear and for that from fifth to fourth gear.

As described above, in this embodiment, the standstill determining section 11 determines whether the vehicle is standing still when a gear-shift instruction is given by the shift operation of the rider. The dog-collision resolving section 13 determines whether the clutch is in a completely released position or an engaged position. When the vehicle is standing still and the clutch is in a completely released position, the dog-collision resolving section 13 starts the action of the clutch actuator 41 at the same time as the reception of the gear-shift instruction to shift the clutch from the completely released position to a dog-collision-resolving clutch position. The shift-actuator control section 15 starts the action of the shift actuator 51 after the lapse of the dog-collision-resolving control time from the time the gear-shift instruction is given. As a result, the dog-tooth gear 502 starts to shift toward the dog-hole gear 503 after the clutch has reached the dog-collision-resolving clutch position. Thus the dog-tooth gear 502 rotates with the main shaft 501 before the occurrence of the dog collision, thereby quickly resolving the dog collision.

On the other hand, when the vehicle is standing still, and the clutch position is in an engaged position, the completely releasing section 14 starts the action of the clutch actuator 41 at the same time as the reception of a gear-shift instruction. The completely releasing section 14 shifts the clutch from an engaged position to a completely released position. The shift-actuator control section 15 starts the action of the shift actuator 51 after the lapse of the complete-release control time from the time the gear-shift instruction is given. As a result, the dog-tooth gear 502 starts to shift toward the dog-hole gear 503 after the clutch has reached the completely released position. This reduces the impact to the vehicle when the dog-tooth gear 502 and the dog-hole gear 503 come into engagement, allowing a comfortable gear-shift operation.

The temporal change of the clutch position, the shift-actuator rotation angle, and the gear position achieved by the function of the main microcomputer 1 will be described hereinbelow. FIG. 6 shows the temporal change of the clutch position, the shift-actuator rotation angle, and the gear position in the case where a shift-up instruction is given when the vehicle is standing still with the clutch position released. As described above, the vertical axis of FIG. 6(a) shows the clutch position, the vertical axis of FIG. 6(b) shows the rotation angle of the shift actuator 51, and the vertical axis of FIG. 6(c) shows the gear position. The horizontal axis in FIG. 6 indicates time.

As shown in FIG. 6, the clutch actuator 41 starts a dog-collision resolving operation from the time a gear-shift instruction is given by the rider. On the other hand, the shift actuator 51 starts the shift operation after the lapse of dog-collision-resolving control time (T1) from the time a gear-shift instruction is given from the rider.

The dog-tooth gear 502 starts to shift toward the dog-hole gear 503 as the shift actuator 51 starts the shift operation (t4 in FIG. 6). As shown in the graph, the clutch has already been set in a dog-collision-resolving clutch position when the dog-tooth gear 502 starts shifting. Accordingly, a toque smaller than that for moving the vehicle is transmitted to the main shaft 501 from the engine while the dog-tooth gear 502 is shifting. The main shaft 501 rotates by the torque of the engine. As a result, the dog-tooth gear 502 approaches the dog-hole gear 503 while rotating.

The gear shifting is completed by the engagement of the dog-tooth gear 502 with the dog-hole gear 503 (t6 in the graph). The part in which the gear position does not change temporally during the shifting of the dog-tooth gear 502 indicates temporary dog collision.

The clutch actuator 41 starts a dog-collision-resolving returning operation from the time the shifting of the dog-tooth gear 502 is completed. The shift actuator 51 starts the shift-returning operation after the lapse of rotation-angle maintaining time from the completion of the shifting of the dog-tooth gear 502.

Figure 7:
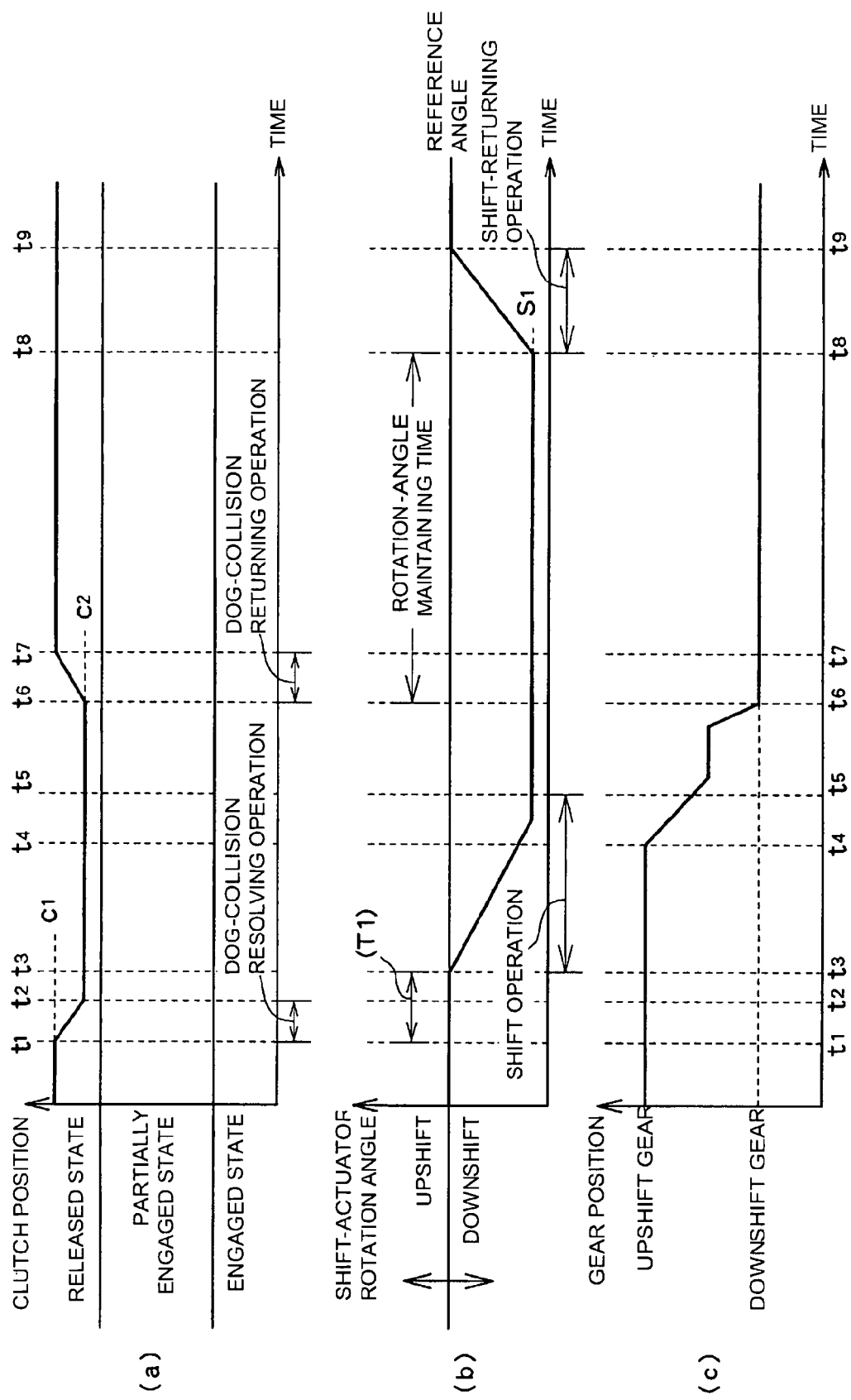
FIG. 7 is a graph showing the temporal change of the clutch position, the rotation angle of the shift actuator, and the position of the gear for a shifting-down operation.

Referring to FIG. 7, the temporal change of the clutch position, the rotation angle of the shift actuator 51, and the gear position when a shift-down instruction is given in the case where the clutch with the vehicle at standstill is set in a released position will be described. As in FIG. 6, the vertical axis of FIG. 7(a) indicates the clutch position, the vertical axis of FIG. 7(b) indicates the rotation angle of the shift actuator 51, and the vertical axis of FIG. 7(c) indicates the gear position. Symbol C1 in FIG. 7(a) indicates a clutch position when the clutch is in a completely released position, and C2 indicates a dog-collision-resolving clutch position.

The temporal change of the clutch position when a shift-down instruction is given while the vehicle is standing still is substantially the same as that when the above-described shift-up instruction is given. Specifically, the dog-collision resolving section 13, to which gear-shift-down instruction information is input, causes the clutch actuator 41 to start a dog-collision resolving operation simultaneously with the input (t1 in FIG. 7). The clutch shifts to a dog-collision-resolving clutch position (clutch position C2 in FIG. 7(a)).

On the other hand, the shift actuator 51 rotates in the opposite direction to that of shift-up operation after the lapse of dog-collision-resolving control time (T1) from the time the shift-down instruction is given (t3 in FIG. 7). The action of the shift actuator 51 stops at the time the rotation angle has reached the maximum shift rotation angel.

The dog-tooth gear 502 starts to shift toward the dog-hole gear 503 by the shift operation of the shift actuator 51 (t4 in FIG. 7). As in the shift-up operation, the clutch has already reached a dog-collision clutch position at the start of the shifting of the dog-tooth gear 502. Thereafter, the dog-tooth gear 502 and the dog-hole gear 503 come into engagement to complete the gear shifting (t6 in FIG. 7).

The clutch actuator 41 starts a dog-collision-resolving returning operation (t6 in FIG. 7) from the time the shifting of the dog-tooth gear 502 has been completed, so that the clutch is again set in the completely released position (clutch position C1). The shift actuator 51 starts the shift returning operation after the lapse of rotation-angle maintaining time from the time the gear shifting has been completed (t8 in FIG. 7). Thereafter, the rotation angle of the shift actuator 51 returns to the reference angle (t9 in FIG. 7).

As described above, when a shift-down instruction is given in the case where the clutch is in a released position while a vehicle is standing still, the clutch is set from the released position to a dog-collision-resolving clutch position before the dog-tooth gear 502 starts to shift. This allows the main shaft 501 to rotate during the shifting of the dog-tooth gear 502, so that the dog-tooth gear 502 approaches the dog-hole gear 503 while rotating. As a result, the dog collision can be resolved quickly.

Referring next to FIG. 8, the temporal change of the clutch position, the rotation angle of the shift actuator 51, and the gear position when an instruction to shift the gear from neutral to first gear is given in the case where the clutch with the vehicle at standstill is set in an engaged position will be described. Also in FIG. 8, the vertical axis of FIG. 8(a) indicates the clutch position, the vertical axis of FIG. 8(b) indicates the rotation angle of the shift actuator 51, and the vertical axis of FIG. 8(c) indicates the gear position. Symbol C1 in FIG. 8(a) indicates a clutch position when the clutch is in an engaged position, C2 indicates a clutch position in a completely released position, and C3 indicates a clutch position with the vehicle at standstill.

As shown in FIG. 8, the clutch actuator 41 starts a clutch-disengaging operation (t1 in FIG. 8) when a gear-shift instruction is given by the rider, and the clutch is set in a completely released position (clutch position C2) (t3 in FIG. 8). The shift actuator 51 starts a shift operation after the lapse of complete-release control time (T2) from the time the gear-shift instruction is given from the rider (t2 in FIG. 8). Thereafter the rotation angle of the shift actuator 51 is maintained at the maximum shift rotation angle (t5 in FIG. 8).

On the other hand, the dog-tooth gear 502 starts shifting by the action of the shift actuator 51 (t4 in FIG. 8). After the dog-tooth gear 502 starts shifting, the dog-tooth gear 502 and the dog-hole gear 503 come into engagement to complete the gear shifting (t6 in FIG. 8). As shown in FIG. 8, the clutch has already been set in a completely released position before the dog-tooth gear 502 and the dog-hole gear 503 come into engagement. Accordingly, after the rotation speed of the main shaft 501 has reduced, the dog-tooth gear 502 and the dog-hole gear 503 come into engagement. As a result, the impact to the vehicle at the engagement of the dog-tooth gear 502 and the dog-hole gear 503 can be reduced, so that a comfortable gear-shift operation is achieved.

The clutch actuator 41 starts a standstill-time-clutch-position operation from the time the shifting of the dog-tooth gear 502 is completed. The shift actuator 51 starts a shift returning operation after the lapse of the rotation-angle-maintaining time from the time the shifting of the dog-tooth gear 502 is completed.

Figure 9:
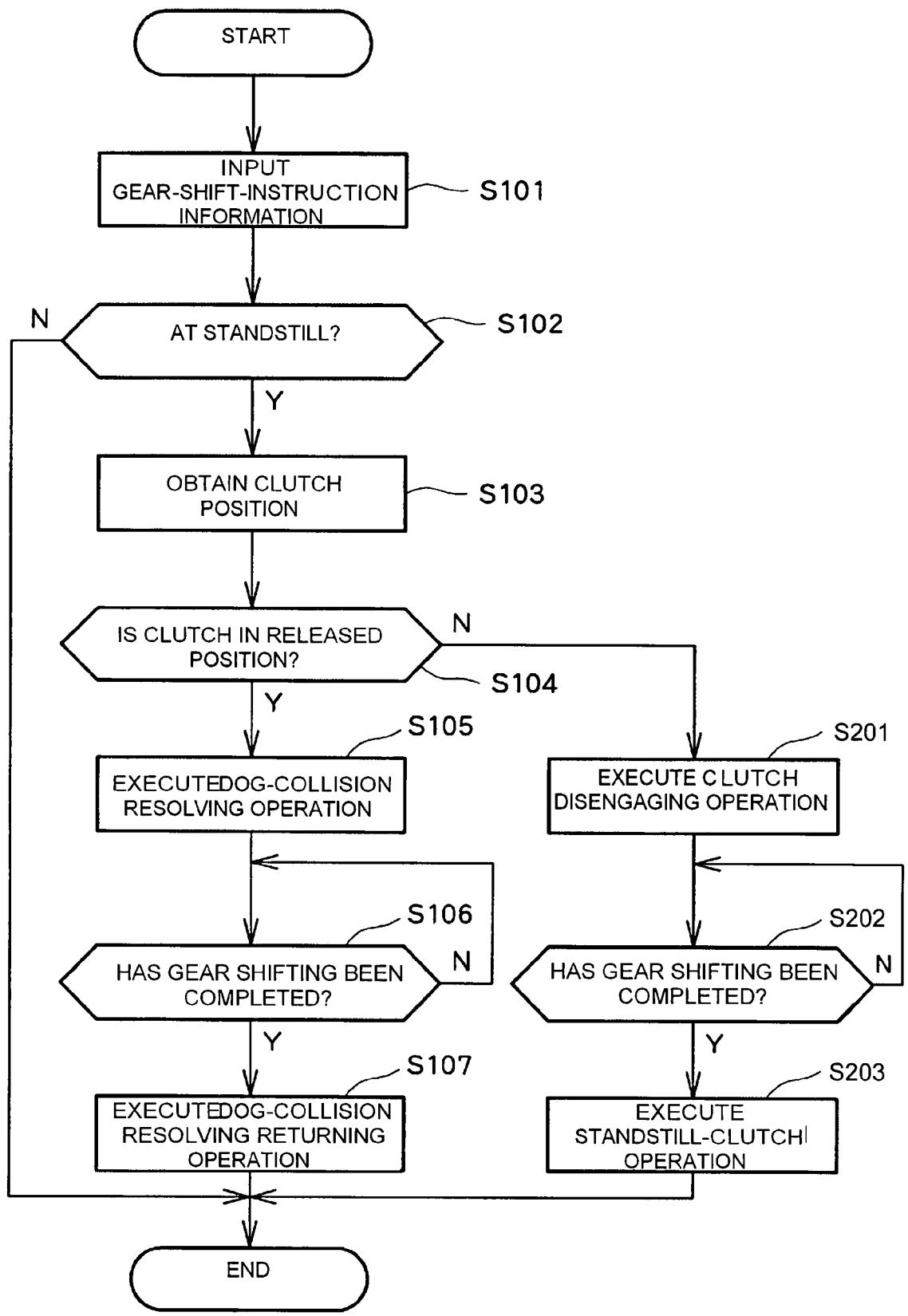
FIG. 9 is a flowchart for the control of a clutch actuator.

Referring to the flowchart of FIG. 9, the control of the clutch actuator 41 will be described. When a gear-shift-instruction information is input from the shift-up switch 91 or the shift-down switch 96 by the shift operation of the rider (S101), the standstill determining section 11 determines whether the vehicle is standing still from the countershaft-RPM information (S102). When it is determined that the vehicle is standing still, the dog-collision resolving section 13 or the completely releasing section 14, to which the gear-shift-instruction information is input, each obtain clutch-position information (S103) to determine whether the clutch is in an engaged position or a completely released position (S104).

When the clutch position is in a completely released position, the dog-collision resolving section 13 activates the clutch actuator 41 to start a dog-collision resolving operation (S105). Thus, the clutch position is set in a dog-collision-resolving clutch position. After the clutch has reached the dog-collision-resolving clutch position by the action of the shift actuator 51, the dog-tooth gear 502 starts to shift toward the dog-hole gear 503. The dog-collision resolving section 13 determines whether the gear shifting has been completed (S106). The dog-collision resolving section 13, which has determined that gear shifting has been completed, activates the clutch actuator 41 again to start a dog-collision resolving operation (S107). Thus, the clutch is again set in the completely released position.

On the other hand, when the completely releasing section 14 determines in step S104 that the clutch is in an engaged state, the clutch actuator 41 is activated to start the clutch disengaging operation (S201). The clutch position is thus set in a completely released position. After the clutch has reached the completely released position by the action of the shift actuator 51, the dog-tooth gear 502 starts to shift toward the dog-hole gear 503. The completely releasing section 14 then determines whether the gear shifting has been completed (S202). The completely releasing section 14, which has determined that the gear shifting has been completed, activates the clutch actuator 41 to start a standstill-clutch-position operation (S203). Thus, the clutch is set in a standstill clutch position.

Figure 10:
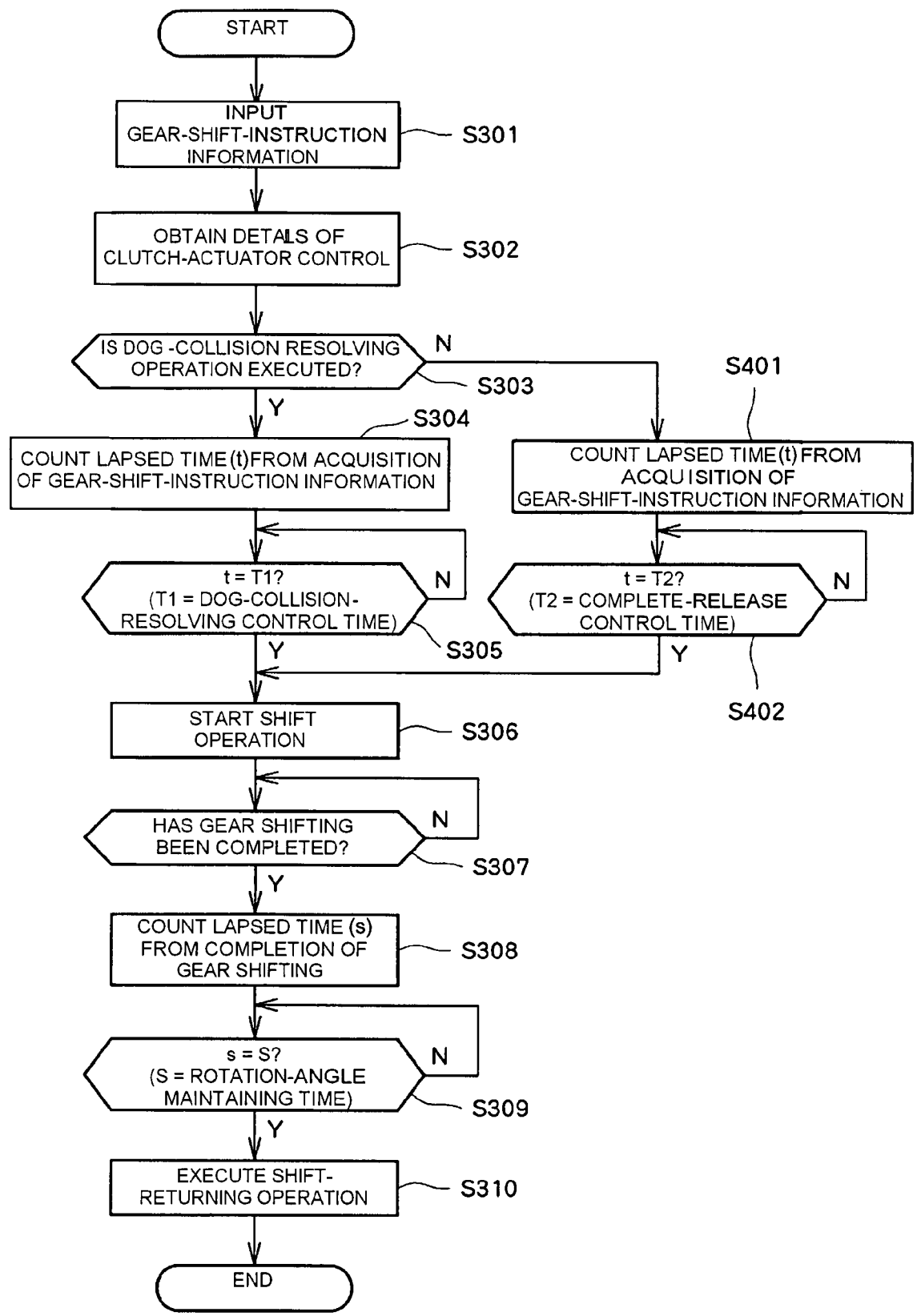
FIG. 10 is a flowchart for the control of a shift actuator.

Referring to the flowchart of FIG. 10, the control of the shift actuator 51 will be described. Gear-shift-instruction information is input from the shift-up switch 91 or the shift-down switch 96 to the shift-actuator control section 15 by the shift operation of the rider (S301). The shift-actuator control section 15, to which the gear-shift-instruction information is input, is notified of the details of the control executed by the clutch-actuator control section 12 (a dog-collision resolving operation or a completely releasing operation) (S302). The shift-actuator control section 15 then determines which of the dog-collision resolving operation and the completely releasing operation is executed (S303). When the dog-collision resolving operation is executed by the dog-collision resolving section 13, the shift-actuator control section 15 starts a shift operation after the lapse of the dog-collision-resolving control time (T1). Specifically, the shift-actuator control section 15 counts the lapsed time (t) from the time the gear-shift-instruction information is given (S304) to determine whether the lapsed time has reached the dog-collision-resolving control time (T1) (S305). The shift-actuator control section 15 starts the shift operation from the time the dog-collision-resolving control time (T1) has come (S306). Thus, the rotation angle of the shift actuator 51 is set at the maximum shift rotation angle.

On the other hand, when the completely releasing operation is executed by the completely releasing section 14, the shift-actuator control section 15 starts the shift operation after the lapse of complete-release-operation control time (T2). More specifically, as in the dog-collision resolving operation, the shift-actuator control section 15 counts the lapsed time (t) from the time the gear-shift-instruction information is given (S401) to determine whether the lapsed time has reached the complete-release-operation control time (T2) (S402). The shift-actuator control section 15 starts the shift operation from the time the complete-release-operation control time (T2) has come (S306). Also in this case, the rotation angle of the shift actuator 51 is set at the maximum shift rotation angle.

On the other hand, the dog-tooth gear 502 starts shifting by the action of the shift actuator 51. The shift actuator 51 determines whether the shifting of the dog-tooth gear 502 has been completed (S307). The shift-actuator control section 15, which has determined that the shifting of the dog-tooth gear 502 has been completed, counts the lapsed time (s) from the time the shifting of the dog-tooth gear 502 has been completed (S308). At the time the lapsed time (s) has reached the rotation-angle maintaining time (S), a shift-returning operation is started (S310). Thus the rotation angle of the shift actuator 51 is again set in the reference position.

In this embodiment, a gear-shift instruction is given when the clutch is in a completely released position while the vehicle is standing still, the dog-collision resolving section 13 sets the clutch in a dog-collision-resolving clutch position. The shift-actuator control section 15 starts the shift operation after the lapse of the dog-collision-resolving control time. Accordingly, the dog-tooth gear 502 moves with the rotation of the main shaft 501 to come close to the dog-hole gear 503 while rotating from the start of the shifting toward the dog-hole gear 503. As a result, the dog collision can be resolved quickly, allowing smooth gear shifting.

According to one embodiment, the clutch 400 is a multiplate wet clutch. Even if the friction discs 401 and the clutch discs 402 are separated from each other, the clutch discs 402 can be moved with the rotation of the friction discs 401. This facilitates setting of the dog-collision-resolving clutch position.

The transmission control apparatus 10 according to one embodiment is mounted to a motorcycle that is one form of a straddle-type vehicle. The transmission control apparatus 10 allows a quick gear-shift operation. Accordingly, even when gear-shift operation with the vehicle at standstill is executed frequently, comfortable shiftability can be achieved.

According to one embodiment, when a shift-up instruction is given when the clutch is in an engaged position with the vehicle at standstill, the completely releasing section 14 sets the clutch in a completely released position. The shift-actuator control section 15 starts the shift operation after the lapse of the complete-release control time. Thus the transmission of the engine torque to the main shaft 501 is completely interrupted, so that the rotation speed of the main shaft 501 is reduced, at which the dog-tooth gear 502 and the dog-hole gear 503 come into engagement. As a result, the impact to the vehicle at the engagement of the dog-tooth gear 502 and the dog-hole gear 503 is reduced, allowing comfortable shiftability for the rider.

According to one embodiment, the determination whether the vehicle is standing still is made from the RPM of the countershaft 510 by the standstill determining section 11. This allows accurate and easy determination of whether the vehicle is standing still.

It is to be understood that the invention is not limited to the foregoing embodiment. For example, according to the embodiment, the dog-tooth gear 502 shifts toward the dog-hole gear 503. However, the shifting gear is not limited to the dog-tooth gear 502, but the dog-hole gear 503 may shift toward the dog-tooth gear 502.

According to the embodiment, the dog-clutch gear is coupled to the main shaft 501, and the dog-tooth gear 502 approaches the dog-hole gear 503 while rotating. Alternatively, the dog-clutch gear may be coupled to the countershaft 510, and one of the dog-tooth gear of the countershaft 510 and the dog-hole gear may approach the other according to a gear-shift instruction. In this case, the torque of the engine sufficient to rotate a gear that idles on the countershaft 510 has only to be transmitted to the gear that idles on the countershaft 510 via the clutch 400, the main shaft 501, and a gear that is coupled thereto. Accordingly, the gear that idles on the countershaft 510 moves while rotating, allowing smooth gear shifting with the vehicle at standstill.

According to the embodiment, the transmission 500 includes the countershaft-RPM sensor 92 to determine whether the vehicle is at a standstill from the RPM information obtained by the countershaft-RPM sensor 92. The determination whether the vehicle is standing still is not limited to that, but it may be made from the vehicle speed sensed by the speed sensor of the vehicle. The determination whether the countershaft is rotating can be performed by providing a sensor for sensing the RPM of the countershaft and them by judging based on the RPM of the countershaft sensed by the countershaft-RPM sensor. The determination whether the countershaft is rotating can also be made by measuring the amount of the movement of the chain, shaft, or tire wheel which transmits the rotation of the countershaft to the wheel. It is also possible to have a sensor for sensing the RPM of the main shaft to determine the presence of the rotation of the countershaft by calculation using the RPM sensed by the sensor and the reduction ratio of the transmission. It is also possible to determine whether the countershaft is rotating from the vehicle speed sensed by a vehicle speed sensor.

According to the embodiment, the dog-collision resolving section 13 determines whether the clutch with the vehicle at standstill is in a completely released position. The determination is not limited to that, but a determination may be made whether the clutch with the vehicle at standstill is close to the released position relative to the dog-collision-resolving clutch position. The dog-collision resolving section 13 may execute the dog-collision resolving operation when the clutch with the vehicle at standstill is close to the released position relative to the dog-collision-resolving clutch position.

The above-described systems and methods can also be used with other types of transmissions, clutch mechanisms and associated control systems and routines, such as those described in one or more of the following copending U.S. patent applications: (1) application Ser. No. 11,301,282, filed on even date herewith, which is entitled STRADDLE-TYPE VEHICLE HAVING CLUTCH CONTROL DEVICE AND METHOD OF USING CLUTCH CONTROL DEVICE and which has; (2) application Ser. No. 11,301,282, filed on even date herewith, which is entitled STRADDLE-TYPE VEHICLE HAVING CLUTCH ENGAGEMENT CONTROL DEVICE AND METHOD OF USING CLUTCH ENGAGEMENT CONTROL DEVICE and which has; (3) application Ser. No. 11,301,282, filed on even date herewith, which is entitled CLUTCH ACTUATOR FOR STRADDLE-TYPE VEHICLE and which has; and (4) application Ser. No. 11,301,282, filed on even date herewith, which is entitled GEAR CHANGE CONTROL DEVICE AND METHOD and which has. The contents of all of the above-noted copending U.S. patent applications are hereby incorporated by reference in their entireties.

In addition, although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. For example, various methods comprising one or more steps and procedures have been described. However, it should be appreciated that in modified embodiments, the order of these steps and procedures can be changed and/or one or more steps and procedures can be combined, eliminated and/or subdivided.

Moreover, while particularly useful for straddle-type vehicles, the skilled artisan can readily adopt the principles and advantages described herein to a variety of other applications, including larger scale devices. Additionally, it is contemplated that various aspects and features of the invention described can be practiced separately, combined together, or substituted for one another, and that a variety of combinations and subcombinations of the features and aspects can be made and still fall within the scope of the invention. Thus, it is intended that the scope of the present invention herein disclosed should not be limited by the particular disclosed embodiments described above, but should be determined only by a fair reading of the claims that follow.

What is claimed is:

1. A transmission control apparatus for a straddle-type vehicle having a clutch and a transmission with a dog clutch having a first gear and a second gear, the transmission control apparatus comprising:
   means for determining whether the vehicle is standing still; and
   means for setting the clutch in a predetermined position that is between a partially engaged position and a completely released position when the vehicle is determined to be standing still and in response to an instruction to engage an engaging portion of the first gear with an engaged portion of the second gear.

2. The transmission control apparatus according to claim 1, further comprising means for engaging the first gear with the second gear after the clutch is set in the predetermined position.

3. The transmission control apparatus according to claim 1, wherein the predetermined position is a position where a torque generated by a driving source is sufficient to rotate either the first or the second gear but is not sufficient to move the vehicle.

4. The transmission control apparatus according to claim 1, wherein the means for determining whether the vehicle is standing still includes means for sensing the rotation of a countershaft that outputs torque from a driving source to a wheel of the vehicle.

5. The transmission control apparatus according to claim 1, wherein the means for determining whether the vehicle is standing still includes means for sensing a position of the clutch when the instruction to engage the engaging portion of the first gear with the engaged portion of the second gear is given.

6. The transmission control apparatus according to claim 1, in combination with the straddle-type vehicle comprising the clutch and the transmission with the dog clutch.

7. The transmission control apparatus according to claim 6, wherein the clutch is a multiplate wet clutch comprising a driving member and a driven member.

8. The transmission control apparatus according to claim 7, wherein the predetermined position is a position where the driving member and the driven member of the clutch are separated from each other.

9. A method for controlling the transmission of a straddle-type vehicle having a clutch and a transmission with a dog clutch having a first gear and a second gear, comprising:
   determining whether the vehicle is standing still; and
   setting the clutch position in a predetermined position between a partially engaged position and a completely released position when the vehicle is determined to be standing still and in response to an instruction to engage an engaging portion of the first gear with an engaged portion of the second gear.

10. The method according to claim 9, further comprising engaging the first gear with the second gear after the clutch is set in the predetermined position.

11. The method according to claim 9, wherein the predetermined position is a position where a torque generated by a driving source is sufficient to rotate either the first or the second gear but is not sufficient to move the vehicle.

12. The method according to claim 9, wherein determining whether the vehicle is standing still comprises sensing the rotation of a countershaft that outputs torque from a driving source to a wheel of the vehicle.

13. The method according to claim 9, determining whether the vehicle is standing still comprises sensing a position of the clutch when the instruction to engage the engaging portion of the first gear with the engaged portion of the second gear is given.

14. The method according to claim 9, further comprising setting the clutch in the completely released position when the vehicle is determined to be standing still with the clutch engaged and in response to the instruction to engage the engaging portion of the first gear with the engaged portion of the second gear.

15. The method according to claim 14, further comprising engaging the first gear with the second gear after the clutch is set in the completely released position.

16. The method according to claim 9, further comprising determining if the clutch is engaged when the vehicle is standing still.

17. A transmission control apparatus for a straddle-type vehicle having a clutch and a transmission with a dog clutch having a first gear and a second gear, the transmission control apparatus comprising:
   a clutch actuator configured to engage and disengage the clutch;
   a transmission actuator configured to change a gear of the transmission;
   an input device configured to generate a gear change command;
   a first sensor configured to determine whether the vehicle is in a standstill condition; and
   a controller operatively connected to the clutch actuator, the transmission actuator and the first sensor, the controller configured to, in response to the gear change command, set the clutch position between a partially engaged position and a completely released position if the vehicle is standing still as determined by the first sensor.

18. The transmission control apparatus according to claim 17, further comprising a second sensor configured to determine with the clutch is engaged.

19. The transmission control apparatus according to claim 18, wherein the controller is further configured to set the clutch in the completely released position when the vehicle is determined to be standing still as determined by the first sensor with the clutch engaged as determined by the second sensor and in response to the gear change command.

20. The transmission control apparatus according to claim 19, wherein the controller is configured to engage the first gear with the second dear after the clutch is set in the completely released position.

21. The transmission control apparatus according to claim 17, wherein the controller is configured to engage the first gear with the second gear after the clutch is set in the predetermined position.

22. The transmission control apparatus according to claim 17, wherein the predetermined position is a position where a torque generated by a driving source is sufficient to rotate either the first or the second gear but is not sufficient to move the vehicle.

* * * * *